(12) United States Patent
Murakami

(10) Patent No.: US 6,683,634 B2
(45) Date of Patent: Jan. 27, 2004

(54) IMAGE FORMING APPARATUS OF A 4-SERIES DRUM CONFIGURATION

(75) Inventor: Naoya Murakami, Yokohama (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 0 days.

(21) Appl. No.: 10/014,578

(22) Filed: Dec. 14, 2001

(65) Prior Publication Data

US 2003/0112317 A1 Jun. 19, 2003

(51) Int. Cl.[7] .......................... G03G 15/00; B41J 2/385
(52) U.S. Cl. ........................ 347/116; 347/900; 358/1.16
(58) Field of Search ................................ 347/115, 116, 347/118, 900, 234, 235, 248, 249, 250; 358/1.16, 1.17, 501

(56) References Cited

U.S. PATENT DOCUMENTS 5,099,260 A * 3/1992 Sato et al. .................. 347/116
5,978,561 A * 11/1999 Kimura et al. .............. 347/116

FOREIGN PATENT DOCUMENTS

JP 11-170621 6/1999

* cited by examiner

*Primary Examiner*—Joan Pendegrass
(74) *Attorney, Agent, or Firm*—Foley & Lardner

(57) ABSTRACT

A 4-series tandem type full color copying machine is described. This system can perform successive high-speed delay processes by receiving a delay amount control signal from an engine portion and controlling the delay amount. The system can easily correct differences between delay amounts caused by distances between photosensitive drums due to registration in a high-speed processing system in which first and second pages are successively input.

10 Claims, 15 Drawing Sheets

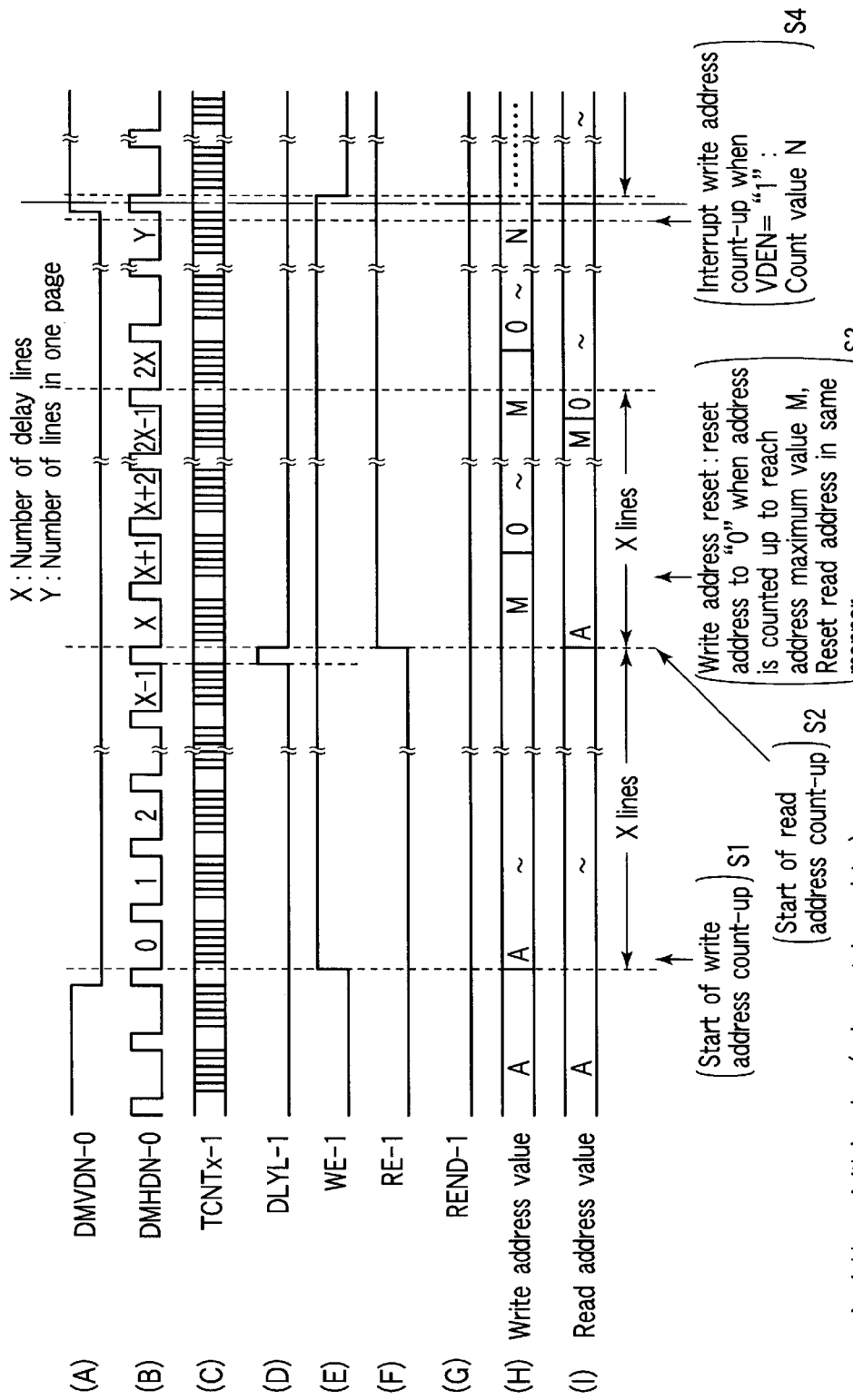

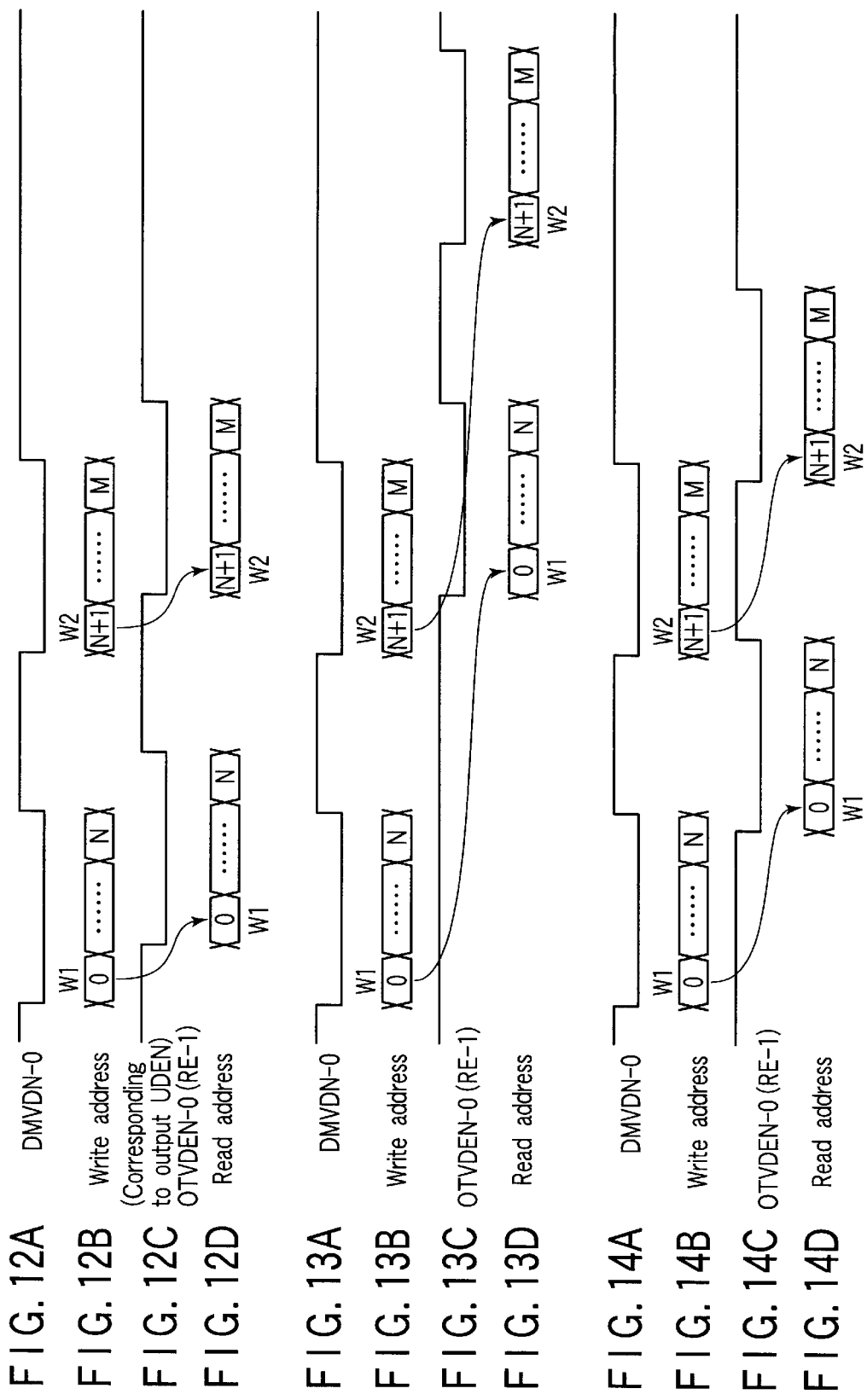

IMAGE FORMING APPARATUS OF A 4-SERIES DRUM CONFIGURATION

BACKGROUND OF THE INVENTION

This invention relates to an image forming apparatus such as a full color copying machine or color printer.

Conventionally, as an image forming apparatus which outputs a color image, a so-called 4-series tandem type full color copying machine in which four image forming units configured to form toner images of respective colors of yellow (Y), magenta (M), cyan (C) and black (BK) based on image signals subjected to color separation are arranged along a conveyor belt is known.

Each of the image forming units of respective colors includes a photosensitive drum arranged to roll in contact with the conveyor belt, an electrifying device which charges the drum surface to preset potential, an exposure device which exposes the drum surface to form an electrostatic latent image thereon, a developing device which supplies toner to the electrostatic latent image on the drum surface to develop the same, and a transfer device which transfers a thus developed toner image onto recording paper attracted to and fed by the conveyor belt. Thus, recording paper attracted to the conveyor belt is fed through the four image forming units (process units), toner images of respective colors are transferred onto the recording paper in a superposed fashion, and then the recording paper is fed to a fixing device in which the toner images of respective colors are fixed on the recording paper to form a color image.

The above 4-series tandem type full color copying machine includes a scanner section, image processing section and printer section.

As the 4-series drum configuration of the printer section, four process units and photosensitive members of Y-M-C-BK are physically separated and arranged. For example, if the distance is 75 mm, the separation distance of 75 mm in the case of 600 dpi indicates that the above units are arranged with a separation of 600 dpi/25.4 dots/mm*75 mm=1771 lines. That is, 600÷(coefficient of conversion from inch to millimeter)×75

=600÷25.4×75

=1771 (lines).

The image signals are input from the image processing section to the printer section as Y, M, C, BK signals in correspondence to Y-M-C-BK of the process units.

In this case, the configuration can be made such that a laser positioning signal used to control the laser output position can be input to the printer section together with the image signals.

The Y, M, C, BK image signals input from the image processing section are used to form respective images according to the image forming timing of the printer section.

In the image forming timing in the printer section, the image forming timing in the sub-scanning direction is explained.

In the conventional monochrome copying machine, an image is formed by synchronizing the paper feeding timing of the printer section with the read scan start timing and starting the scanning process at timing such that a toner image formed on the photosensitive drum may form an image in a preset position of paper fed.

In the image forming process in the 4-series tandem engine, the image forming timing for yellow is determined by adjusting the paper feeding timing and scan timing like the conventional monochrome image forming timing in a case where images are formed on the paper in an order of Y, M, C, BK (which are abbreviation of yellow, magenta, cyan, black).

On the other hand, in the image forming process for other colors of M, C, BK in the 4-series tandem engine, it is required to superpose images on the yellow image and it is necessary to strictly perform timing control in the main scanning direction and sub-scanning direction.

The superposition technique in the main scanning direction and sub-scanning direction is called a registration technique and the timing control process in the main scanning direction is performed by use of the known technique.

In this case, image formation timing control of Y, M, C, BK in the 4-series drums in the sub-scanning direction is explained.

In the conventional image forming system in the 4-series drum system, generally, superposition or registration of image data items for the respective drums can be attained by inputting all color signals of Y, M, C, BK to a delay memory controller at the same timing and delaying respective image data items of M, C, BK according to the distances between the drums of Y-M, Y-C, Y-BK in the delay memory controller.

The drum—drum distance is expressed by the number of sub-scanning lines based on the sub-scanning resolution, the number of sub-scanning lines is counted from the yellow image forming timing set as the starting point, and image data of magenta color is delayed by the memory and output so that the sub-scanning deviation amount (the number of output timings) of magenta color with respect to yellow color will become equal to the drum—drum distance (the number of sub-scanning lines corresponding to the drum—drum distance) (for example, if the drum—drum distance is 75 mm, the image data is output with the delay of 1771 lines).

The output image signal is input to the laser control section of the printer section and used as an ON/OFF signal of laser to form an image on the photosensitive drum.

In the same manner as described above, image data items of C, BK are delayed by the sub-scanning deviation amounts (3542 lines, 5313 lines) between the drums of Y-C, Y-B and output, and consequently, four colors of Y, M, C, BK are output and superposed. Thus, a method for attaining registration of four colors by use of the engine of 4-series drum configuration is known as a general method.

The measurement and adjustment of the drum—drum distances of respective colors are attained by measuring the distances by use of the known sub-scanning registration technique and feeding back the measured data to the number of sub-scanning lines.

With the above method, a sub-scanning counter is counted up with the yellow image input timing set as a reference and image data of magenta is output so that the count of the sub-scanning counter will become equal to the output timing of magenta color. Therefore, when the process for the longest drum—drum distance of Y-BK is performed, image data of BK is kept stored in the memory until the output timing of BK color is attained after the image data items of Y, M, C, BK were input and then the image data of BK is started to be output at the output start timing of BK in many cases.

Since the sub-scanning deviation amount is counted because of correction of sub-scanning delay even after the input image data effective area comes to an end, there occurs a possibility that the image forming position is shifted from an original position when a print in which input timing of the first page and input timing of the second page are close to each other is made.

Specifically, at the time of high-speed image printing, if an image is input at output timing at which a yellow image is newly input before the sub-scanning count timing of M, C, BK is terminated (before M, C, BK colors start to be output), the counts of the M, C, BK color delay counters are cleared, timings deviated from the original counts are counted, and consequently, a problem that the image forming position is shifted from the correct position occurs. Generally, the process for inputting the image at such timing is inhibited and it is necessary to terminate outputting of the images of M, C, BK colors when the first and second pages are input because of the above restriction. Therefore, the above method is not suitable for the high-speed printing.

BRIEF SUMMARY OF THE INVENTION

An object of this invention is to provide a 4-series tandem type full color copying machine capable of attaining a high-speed process.

In order to attain the above object, an image forming apparatus of this invention comprises a supply section which supplies image data items of different colors; an image forming section including a feeding section which feeds a recording medium, a plurality of image forming units which respectively have rotatable photosensitive drums arranged side by side on the feeding section and transfer respective image data items of different colors onto the recording medium fed by the feeding section, and an output section which outputs sync signals in a sub-scanning direction in synchronism with the processes by the respective image forming units; and a delay section which delays image data items of respective colors from the supply section by feeding times of the recording medium corresponding to intervals between the respective image forming units based on the sync signals from the output section of the image forming section and outputs the image data items to the image forming section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given below, serve to explain the principle of the invention.

FIGS. 11A and 11B are timing charts for illustrating signals and addresses in the delay memory controller (DMC), and FIGS. 12A to 12D, FIGS. 13A to 13D and FIGS. 14A to 14D are timing charts for illustrating a delay memory control method when two pages are successively printed.

DETAILED DESCRIPTION OF THE INVENTION

There will now be described an image forming apparatus according to an embodiment of this invention with reference to the accompanying drawings.

Figure 1:
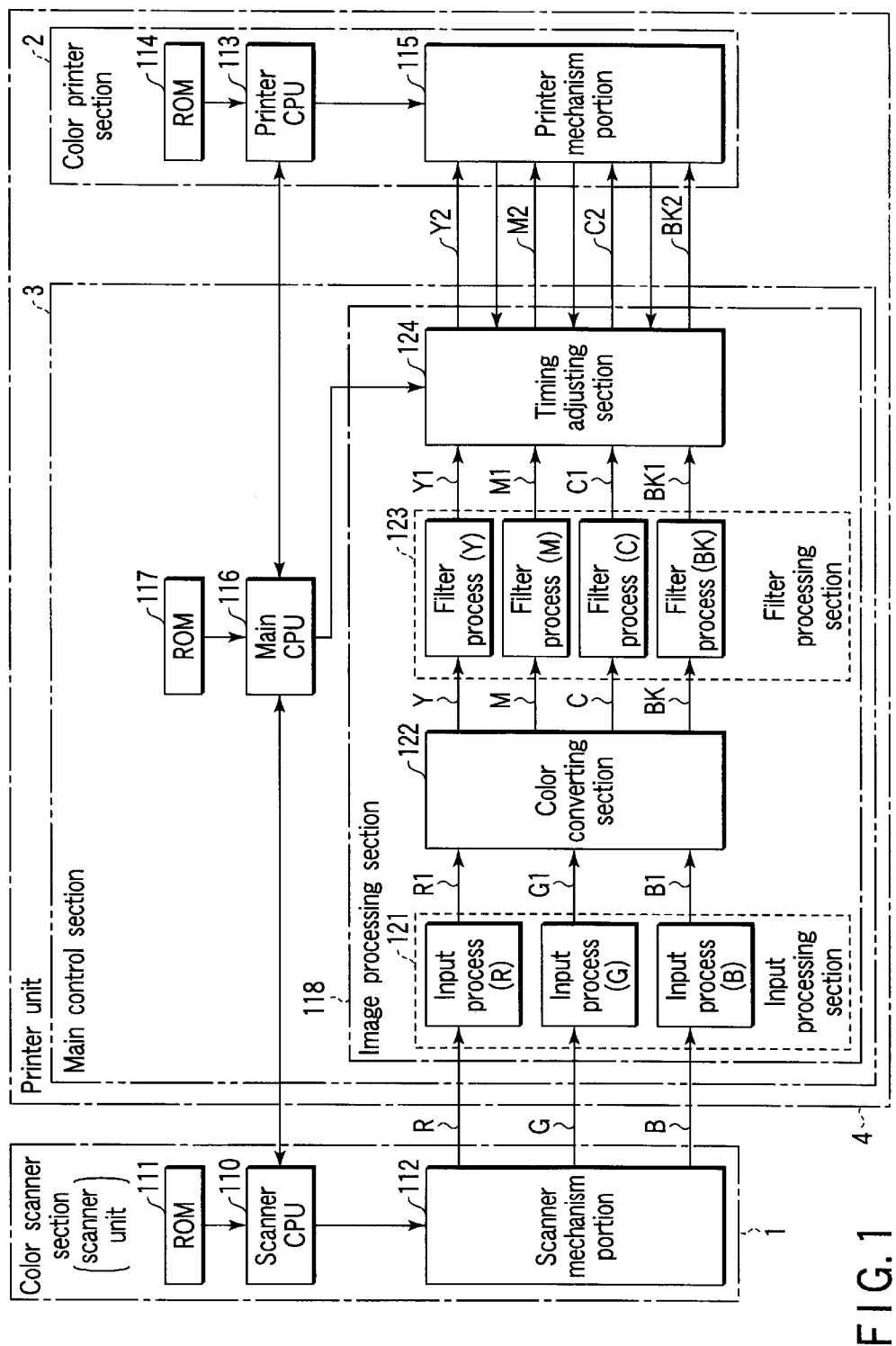
FIG. 1 is a block diagram showing the schematic configuration of an image forming apparatus.

FIG. 1 schematically shows the internal configuration blocks of an image forming apparatus according to this invention such as a color digital copying machine which reads a color image on a document and forms a copy image thereof. The image forming apparatus is roughly configured by a color scanner section (scanner unit) 1 used as image reading means for reading a color image on a document and inputting the same and a printer unit 4 which includes a color printer section 2 used as image forming means for forming a copy image of the input color image and a main control section 3 which controls the whole portion of the image forming apparatus.

The main control section 3 controls the whole portion of the color digital copying machine.

The color scanner section 1 reads image information of a to-be-copied object (not shown), for example, a document which is placed on a document table by an automatic document feeder (ADF) 17 as brightness information and forms image signals (R: red, G: green, B: blue).

The color scanner section 1 includes a scanner CPU 110 which controls the whole portion of the scanner section, a ROM 111 in which a control program and the like are stored, a data storage RAM (not shown), and a scanner mechanism portion 112.

The scanner mechanism portion 112 includes an optical system which reads and scans a document, a moving mechanism which moves the optical system along the document table, a color image sensor on which a document image is made incident by the optical system and which converts the document image into image signals of respective colors, and an image correcting section which corrects the image signals output from the color image sensor.

The color printer section 2 includes a printer CPU 113 which controls the whole portion of the printer section, a ROM 114 in which a control program and the like are stored, a data storage RAM (not shown), and a printer mechanism portion (IMC) 115.

The printer mechanism portion 115 includes printers which make prints based on image data items of respective colors (Y, M, C, BK) color-separated by an image processing section (IMG) 118 as will be described later. Each printer includes a photosensitive drum used as an image carrier, an electrifying device which charges the surface of the photosensitive drum, an exposure device which has a semiconductor laser oscillator whose light emission is controlled based on image data of a corresponding one of colors (Y, M, C, BK) subjected to color separation and forms an electrostatic latent image on the photosensitive drum, a developing device which supplies toner to the electrostatic latent image on the photosensitive drum surface to develop the same, a feeding mechanism which feeds paper as an image forming medium, a transfer device which transfers a toner image on the photosensitive drum onto the paper fed by the feeding mechanism, a fixing device which thermally fixes the toner image transferred on the paper by the transfer device and the like.

The main control section 3 includes a main CPU 116 which controls the whole portion of the control section, a ROM (read only memory) 117 in which a control program and the like are stored, and an image processing section (IMG) 118 which subjects image data input from the color scanner section 1 and color-separated into red (R), green (G), blue (B) to the color conversion process and filtering process and outputs print data thus obtained to the printer section 2.

Further, although not shown in the drawing, the main control section 3 includes a RAM which temporarily stores data, an NVRAM (nonvolatile random access memory) which is a nonvolatile memory backed up by a battery, a common RAM used to make bi-directional communication between the main CPU 116 and the printer CPU 113, a page memory which has an area capable of storing image information of plural pages and is configured to store data obtained by compressing image information from the color scanner section 1 for each page, and a page memory control section which stores or reads out image information with respect to the page memory.

The image processing section 118 includes an input processing section 121 to which image data items color-separated into red (R), green (G), blue (B) are input from the color scanner section 1, a color converting section 122 used as color conversion means for converting the image data items of R, G, B from the input processing section 121 into data items of yellow (Y), magenta (M), cyan (C), black (BK), a filter processing section 123 which subjects the image data items of Y, M, C, BK output from the color converting section 122 to processes such as enlargement, reduction, elimination of the ground, elimination of noise, edge emphasis, and a timing adjusting section 124 which outputs image data items Y2, M2, C2, BK2 at timings corresponding to the distances between the respective photosensitive drums 44a, according to the image data items of Y1, M1, C1, BK1 output from the filter processing section 123.

Figure 2:
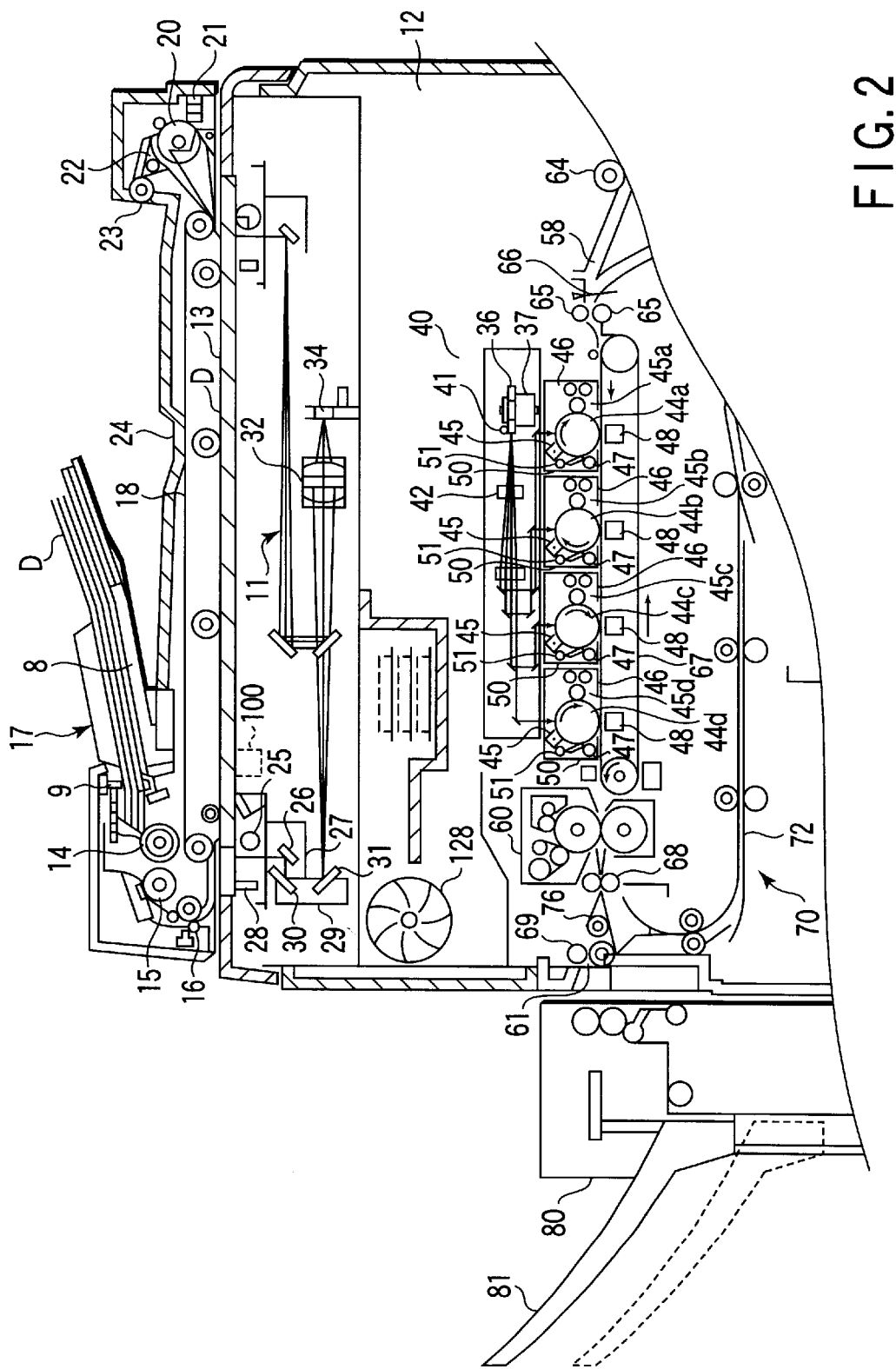
FIGS. 2 and 3 are cross sectional views each showing the schematic structure of the image forming apparatus.
Figure 3:
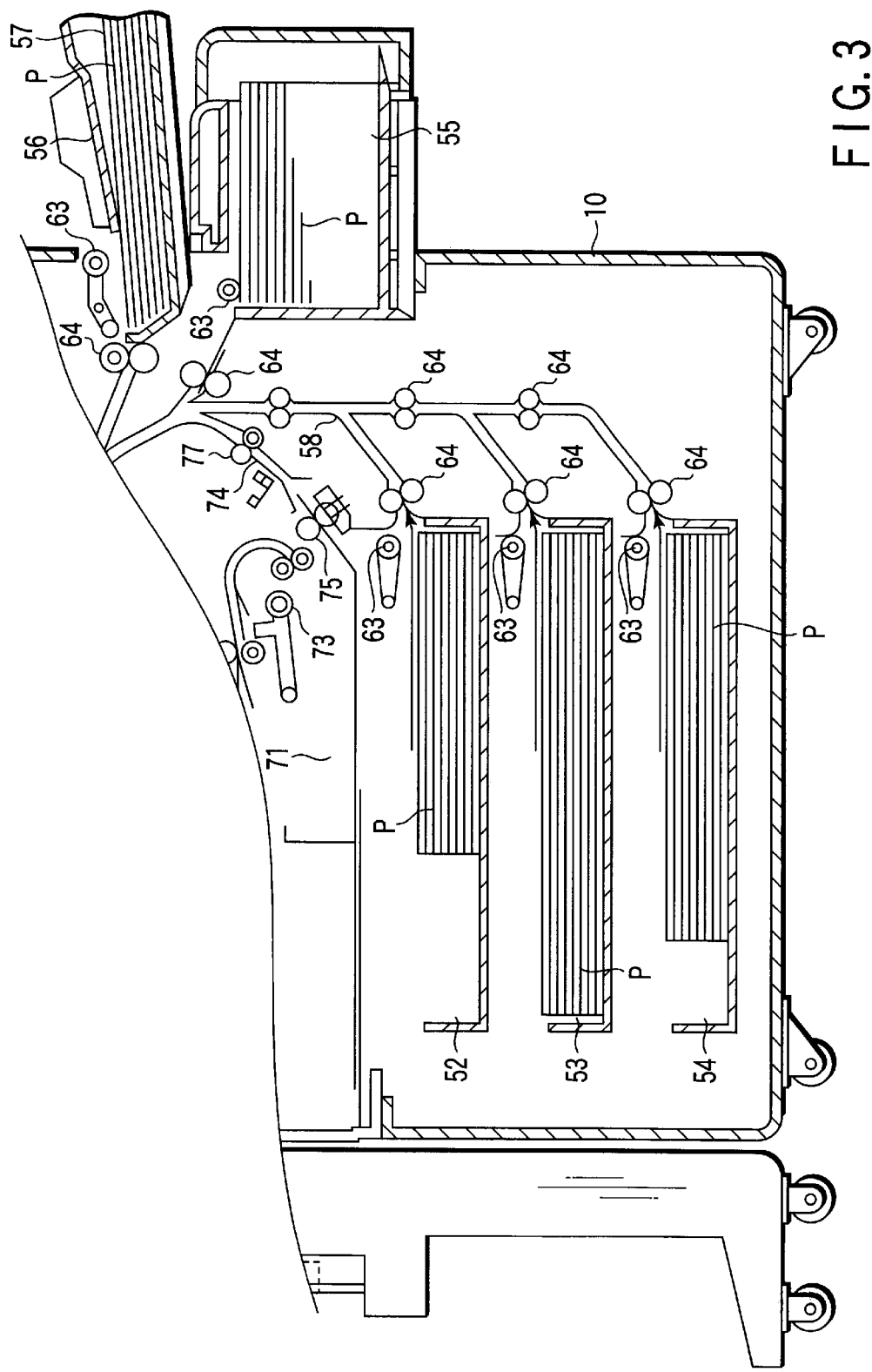

FIGS. 2 and 3 are internal structural views for illustrating the color digital copying machine.

On the upper portion of the apparatus main body 10, the automatic document feeder (which is hereinafter referred to as an ADF) 17 which automatically feeds sheet-like documents one by one and is also used as a document cover is provided to be freely set into the open/closed state. Instead of the above ADF 17, a platen which is used as a document cover may be mounted. On the front upper portion of the apparatus main body 10, an operation panel (not shown) having various displays and various operation keys used to specify copy conditions and copy start is provided.

On a portion of the apparatus main body 10 which lies near the mounting portion of the ADF 17, a detector 100 which detects the open/closed state of the ADF 17 is provided. The detector 100 is so configured as to detect the open/closed state of the platen when the platen is used instead of the ADF 17.

On the right side portion of the apparatus main body 10, a paper cassette 57 capable of receiving a small capacity of paper sheets and a large capacity paper cassette 55 capable of receiving a large capacity of paper sheets are removably provided. The paper cassette 57 has a tray 56 for manual paper-feeding.

On the lower portion of the apparatus main body 10, paper cassettes 52, 53, 54 are removably provided. Paper sheets of the different size are received in the lateral and vertical directions in the respective paper cassettes and selectively used as required. On the left side portion of the apparatus main body 10, a finisher 80 which receives the copied paper is provided.

In the apparatus main body 10, the scanner mechanism portion 112 of the scanner section 1 used as acquisition means for acquiring image data and the print mechanism portion 112 of the color printer section 2 used as image forming means are provided in order to attain the copying function and facsimile function.

On the upper surface of the apparatus main body 10, a document table 13 formed of a transparent glass plate on which a to-be-read object, that is, a document D is placed, and the ADF 17 which automatically feeds the document onto the document table 13 are arranged. The ADF 17 is arranged to be freely set into the open/closed state with respect to the document table 13 and also functions as a document holder which closely presses the document D placed on the document table 13 against the document table 13.

The ADF 17 includes a document tray 8 on which a document or documents D are set, an empty sensor 9 which detects the presence or absence of a document, a pickup roller 14 which takes out the documents D one by one from the document tray 8, a paper feeding roller 15 which feeds the taken-out document D, an aligning roller pair 16 which aligns the front end of the document D, an aligning sensor (not shown) which is disposed on the upstream side with respect to the aligning roller pair 16 and detects arrival of the document D, a size sensor (not shown) which detects the size of the document D, and a conveyor belt 18 which is arranged to cover substantially the whole portion of the document table 13. A plurality of documents set in the document tray 9 with the front surfaces up are sequentially taken out from the bottom, that is, from the last page, aligned by the aligning roller pair 16 and then fed to a preset position of the document table 13 by use of the conveyor belt 18.

On the end portion of the ADF 17 opposite to the aligning roller pair 16 with the conveyor belt 18 disposed therebetween, a reversing roller 20, non-reverse sensor 21, flapper 22, paper discharging roller 23 are arranged. The document D whose image information is read by the scanner section 102 which will be described later is fed from the document table 13 by use of the conveyor belt 18 and discharged onto the document discharging portion 24 on the upper surface of the ADF 17 via the reversing roller 20, flapper 22 and paper discharging roller 23.

Further, when the rear surface of the document D is read, the position of the flapper 22 is switched to permit the document D fed by the conveyor belt 18 to be reversed by the reversing roller 20 and then the document D is fed again to the preset position on the document table 13 by the conveyor belt 18.

The ADF 17 includes a paper feeding motor which drives the pickup roller 14, paper feeding roller 15 and aligning roller pair 16 and a feed motor which drives the conveyor belt 18, reversing roller 20 and paper discharging roller 23.

The scanner section 102 arranged in the apparatus main body 10 includes a light source 25 such as a fluorescent light which illuminates the document D placed on the document table 13, and a first mirror 26 which deflects light reflected from the document D in a preset direction. The light source 25 and first mirror 26 are mounted on a first carriage 27 disposed below the document table 13. On the first carriage 27, a size sensor 28 which detects the size of the document placed on the document table 13 is mounted. The first carriage 27 is arranged to move in parallel to the document table 13 and is reciprocally moved below the document table 13 by a driving motor via a toothed belt (not shown) and the like.

Further, below the document table 13, a second carriage 29 which is movable in parallel to the document table 13 is arranged. On the second carriage 29, second and third mirrors 30, 31 which sequentially deflect light reflected from the document D and deflected by the first mirror 26 are mounted at right angles to each other. The second carriage 29 is driven to follow the first carriage 27 by means of a toothed belt and the like which drive the first carriage 27 and moved in parallel to the document table 13 at a speed which is ½ times that of the first carriage 27.

Below the document table 13, an image forming lens 32 which focuses reflected light from the third mirror 31 on the second carriage 29 and a CCD sensor 34 which receives reflected light focused by the image forming lens and photoelectrically converts the light are arranged. The image forming lens 32 is arranged in a plane which contains an optical axis of light deflected by the third mirror 31 to be movable by use of a driving mechanism and forms an image according to the reflected light at a desired magnification by its own movement. Then, the CCD sensor 34 photoelectrically converts the incident reflected light and outputs an electrical signal corresponding to the read image of the document D.

The color printer section 2 includes a laser exposure device 40 which acts as exposing means. The laser exposure device 40 includes a semiconductor laser 41 used as a light source, a polygon mirror 36 used as a scanning member which continuously deflects laser light emitted from the semiconductor laser 41, a polygon motor 37 used as a scanning motor which drives and rotates the polygon mirror 36 at a preset rotation speed as will be described later and an optical system 42 which deflects laser light from the polygon mirror 36 and directs the same to photosensitive drums 44a to 44d as will be described later. The laser exposure device 40 with the above configuration is fixed on and supported by a supporting frame (not shown) of the apparatus main body 10.

The semiconductor laser 41 is ON/OFF-controlled according to image information of the document D read by the scanner section 102 to emit laser light. The laser light is directed toward the photosensitive drums 44a to 44d via the polygon mirror 36 and optical system 42 and scans the outer surfaces of the photosensitive drums 44a to 44d to form electrostatic latent images on the respective outer surfaces of the photosensitive drums 44a to 44d.

The image forming section 12 includes the freely rotatable photosensitive drums 44a to 44d used as image carriers which are arranged in substantially the central portion of the apparatus main body 10 and the outer surfaces of the photosensitive drums 44a to 44d are exposed by the laser light from the laser exposure device 40 and desired electrostatic latent images are formed on the outer surfaces of the photosensitive drums 44a to 44d.

Electric charges 45, which charge preset charges on the outer surfaces of the photosensitive drums 44a to 44d, developing devices 46, which supply toner as developing agents to the electrostatic latent images formed on the outer surfaces of the photosensitive drums 44a to 44d and develop the electrostatic latent images at desired image densities, separation chargers 47, which separate a to-be-copied material (recording medium), that is, a sheet of copy paper P fed from one of the paper cassettes 52, 53, 54, 55 and 57 from the respective photosensitive drums 44a to 44d, transfer chargers 48, which transfer toner images formed on the photosensitive drums 44a to 44d onto the copy paper P, separation claws (not shown) which separate the copy paper P from the outer surfaces of the photosensitive drums 44a to 44d, cleaning devices 50, which eliminate toner remaining on the outer surfaces of the photosensitive drums 44a to 44d, and discharging devices 51, which discharge the outer surfaces of the photosensitive drums 44a to 44d are sequentially arranged in this order around the photosensitive drums 44a to 44d, respectively.

Image forming units 45a to 45d are configured by the photosensitive drums 44a to 44d and the devices respectively arranged around the drums.

In the example of this invention, in order to superpose four color images of Y image, M image, C image and BK image, the image forming units 45a to 45d are arranged in an order of Y, M, C, BK from the upstream side of a direction in which a desired point on the conveyor belt 67 is moved, that is, a direction in which the copy paper P is fed.

Figure 4:
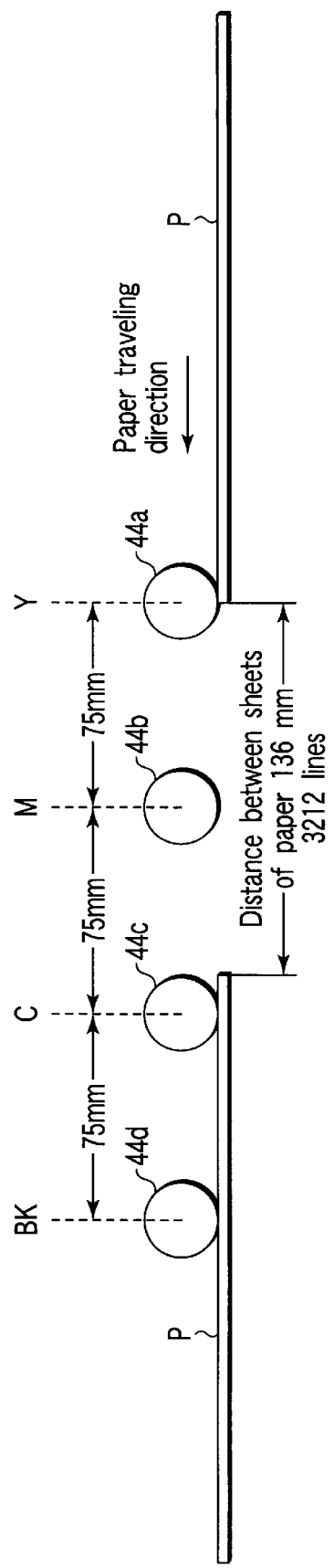
FIG. 4 is a view showing an example of the arrangement of photosensitive drums of respective colors.

As shown in FIG. 4, the photosensitive drums 44a to 44d are physically separated by 75 mm and arranged. As one example, if the separation distance is 75 mm, the distance 75 mm as the feeding distance corresponds to 1771 lines in the case of the resolution 600 dpi.

That is, 600÷(coefficient of conversion from inch to millimeter)×75=600+25.4×75=1771 (lines).

In the lower portion of the apparatus main body 10, the paper cassettes 52, 53, 54 which can be withdrawn from the apparatus main body 10 are arranged in a stack form and sheets of copy paper of different sizes are loaded in the paper cassettes 52, 53, 54. The large-capacity paper cassette 55 is provided beside the paper cassettes 52, 53, 54 and sheets of copy paper with a size frequency used, for example, 3000 sheets of copy paper of A4-size are stored in the large-capacity paper cassette 55. Further, the paper cassette 57 which is also used as the tray 56 for manual-feeding is removably mounted above the large-capacity paper cassette 55.

In the apparatus main body 10, a feeding path 58 which extends from each cassette through transfer sections lying between the photosensitive drums 44a to 44d and the transfer chargers 48 is formed and a fixing device 60 is disposed at the end of the feeding path 58. A discharging port 61 is formed in the side wall of the apparatus main body 10 which is opposite to the fixing device 60 and a finisher 80 is mounted on the discharging port 61.

Pickup rollers 63 each of which takes out sheets of copy paper one by one from a corresponding one of the cassettes are disposed near the paper cassettes 52, 53, 54, 55 and 57. Further, on the feeding path 58, a large number of paper feeding rollers 64 which feed the copy paper P taken out by the pickup roller 63 via the feeding path 58 are disposed.

A resist roller pair 65 is disposed on the upstream side of the feeding path 58 with respect to the photosensitive drums 44a to 44d. The resist roller pair 65 corrects the inclination of the taken-out copy paper P, sequentially aligns the front end of the copy paper P with the front ends of the toner images of the photosensitive drums 44a to 44d and feeds the copy paper P to the transfer section at the same speed as the moving speed of the outer surface of the photosensitive drums 44a to 44d. An aligning sensor 66 which detects arrival of the copy paper P is disposed in front of the resist roller pair 65 that is, on the paper feeding roller 64 side.

Sheets of copy paper P which are taken out one by one from one of the cassettes by the pickup roller 63 are fed to the resist roller pair 65 by use of the paper feeding roller 64. Then, after the front end of the copy paper P is aligned by the resist roller pair 65, the copy paper P is fed to the transfer section by the conveyor belt (transfer belt) 67.

In each of the transfer sections, a development image or toner image formed on a corresponding one of the photosensitive drums 44a to 44d is transferred onto the paper P by the corresponding transfer charger 48. The copy paper P having the toner image transferred thereon is separated from the outer surface of a corresponding one of the photosensitive drums 44a to 44d by the action of the separation charger 47 and separation claw (not shown). After all of the toner images are transferred onto the copy paper P, the copy paper is fed to the fixing device 60 via the conveyor belt 67 configuring part of the feeding path 58. Then, after the development image is melted and fixed on the copy paper P by the fixing device 60, the copy paper P is discharged onto the paper discharging tray 81 of the finisher 80 via the discharging port 61 by use of the paper feeding roller pair 68 and paper discharging roller pair 69.

Below the feeding path 58, an automatic double face setting device (ADD) 70 which reverses the copy paper P having passed through the fixing device 60 and feeds the same to the resist roller pair 65 again is provided. The automatic double face setting device 70 includes a temporary storage section 71 which temporarily stores copy paper P, a reversing path 72 which is branched from the feeding path 58, reverses the copy paper P having passed through the fixing device 60 and feeds the same to the temporary storage section 71, a pickup roller 73 which takes out sheets of copy paper P stored in the temporary storage section one by one, and a paper feeding roller 75 which feeds the taken-out copy paper to the resist roller pair 65 via the feeding path 74. A distribution gate 76 which selectively distributes the copy paper P to the discharging port 61 or reversing path 72 is provided in the branch portion between the feeding path 58 and the reversing path 72.

If the double face copying process is performed, the copy paper P having passed through the fixing device 60 is guided to the reversing path 72 by the distribution gate 76, temporarily stored in the temporary storage section 71 while it is kept in the reversed state, and then fed to the resist roller pair 65 via the feeding path 73 by means of the pickup roller 73 and paper feeding roller pair 75. After this, the copy paper P is aligned by the resist roller pair 65, fed to the transfer section again, and a toner image is transferred onto the rear surface of the copy paper P. Then, the copy paper P is discharged onto the paper discharging tray 81 of the finisher 80 via the feeding path 58, fixing device 60 and paper discharging roller pair 69.

Further, it is also possible to discharge the copy paper with the printed surface down by use of the automatic double face setting device 70. That is, in the same manner as in the case where the double face copying process is performed, first, an image is transferred onto and fixed on the front surface of the copy paper, then the copy paper is temporarily stored in the temporary storage section 71, fed to the resist roller pair 65 via the feeding path 73 by means of the pickup roller 73 and paper feeding roller pair 75, aligned by the resist roller pair 65 and finally discharged onto the paper discharging tray 81 of the finisher 80 via the feeding path 58, fixing device 60 and paper discharging roller pair 69.

Figure 5:
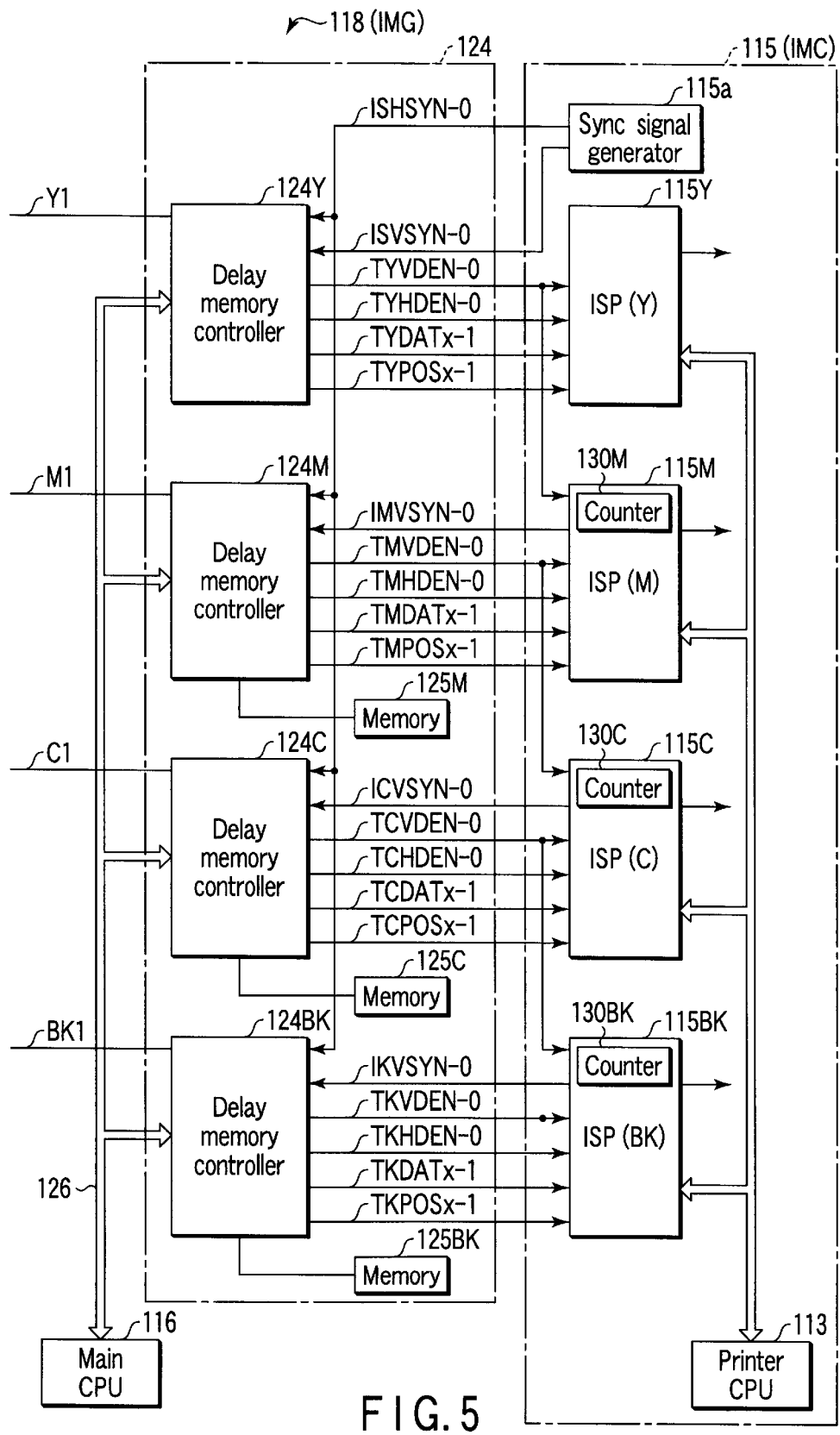
FIG. 5 is a diagram showing the internal configuration of a timing adjusting section and an example of the connection thereof with a color printer section.

Next, the internal configuration of the timing adjusting section 124 and an example of the connection thereof with the color printer section 2 are explained with reference to FIG. 5.

For example, the timing adjusting section 124 includes a delay memory controller (DMC) 124Y for yellow, delay memory controller (DMC) 124M for magenta, delay memory controller (DMC) 124C for cyan, delay memory controller (DMC) 124BK for black, delay memory 125M for magenta, delay memory 125C for cyan and delay memory 125BK for black.

The delay memory 125M is connected to the DMC 124M, the delay memory 125C is connected to the DMC 124C and the delay memory 125BK is connected to the DMC 124BK.

Image data items of Y1, M1, C1, BK1 output from the filter processing section 123 are input to the DMCs 124Y, 124M, 124C, 124BK at the same timing. Image data items of Y1, M1, C1, BK1 from the filter processing section 123 are respectively input to the DMCs 124Y, 124M, 124C, 124BK for respective colors, delay amounts (delay amounts in the sub-scanning direction) are independently controlled with respect to the image data items Y1, M1, C1, BK1 and image data items Y2, M2, C2, BK2 are output at different timings.

The DMC 124Y is not subjected to the delay process in the sub-scanning direction and is provided to set the timing of yellow to the timings of other colors M, C, BK in the main scanning direction. Further, the DMC 124Y is provided only to adjust the circuit delay on the system and if the delay can be corrected in the latter-stage printer section 2, it can be omitted.

The DMCs 124M, 124C, 124BK are respectively connected to the delay memories 125M, 125C, 125BK configured to provide corresponding delay amounts. The delay memories 125M, 125C, 125BK store image data items with delay times.

Figure 6:
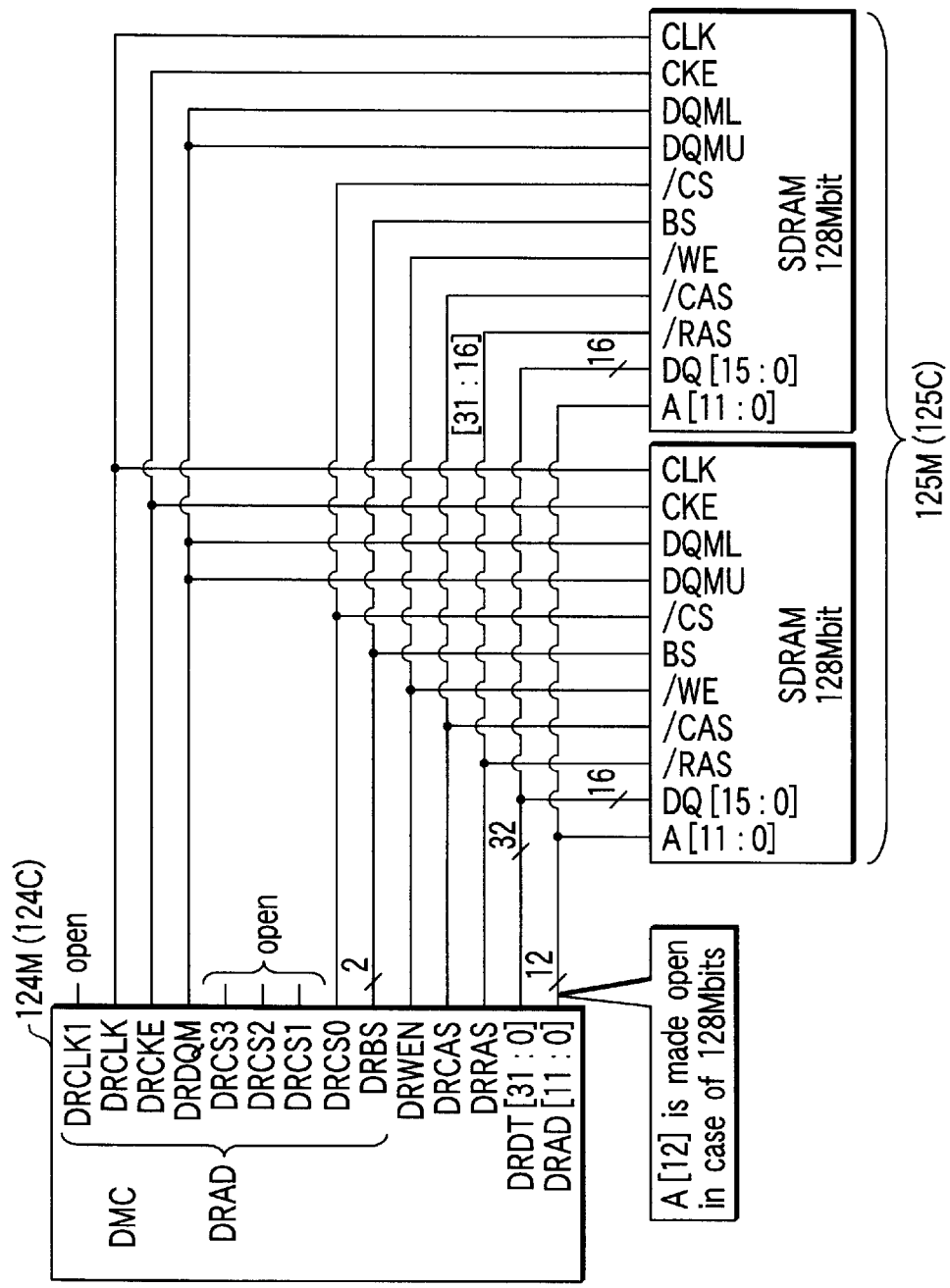
FIGS. 6 and 7 are diagrams showing the schematic configuration of a delay memory connected to a delay memory controller (DMC)
Figure 7:
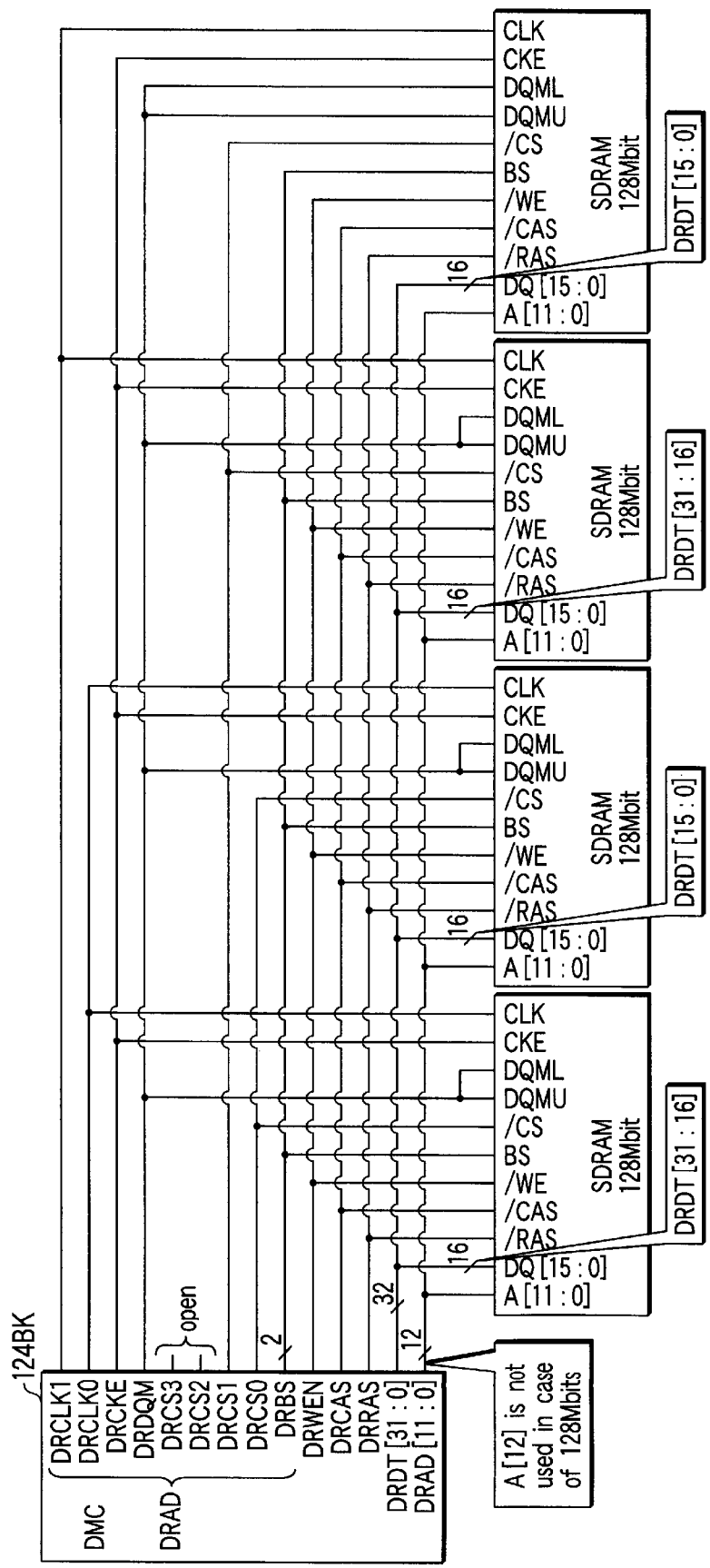

The DMCs 124M, 124C are connected to the 32-Mbyte delay memories 125M, 125C as shown in FIG. 6 and the DMC 124BK is connected to the 64-Mbyte delay memory 125BK as shown in FIG. 7.

Each of the DMCs 124Y, 124M, 124C, 124BK is connected to the main CPU 116 via a bus 126. Therefore, the DMCs 124Y, 124M, 124C, 124BK can be controlled by various control signals supplied from the main CPU 116.

The DMCs 124M, 124C, 124BK determine delay timings of image signals output to the printer section 2 according to external sync signals IMVSYN, ICVSYN, IKVSYN supplied from the printer section 2.

The DMCs 124M, 124C, 124BK control readout of image data stored in the respective delay memories according to the above external sync signals.

The DMCs 124M, 124C, 124BK control storage of image data into the respective delay memories according to the above external sync signals or sync signals in the sub-scanning direction from the scanner section 1.

The DMCs 124Y, 124M, 124C, 124BK are respectively connected to image processors (ISP) 115Y, 115M, 115C, 115BK of the printer mechanism portion 115. Further, the DMCs 124Y, 124M, 124C are also connected to the image processors (ISP) 115M, 115C, 115BK of the printer mechanism portion 115.

A sync signal generator 115a is provided in the printer mechanism portion 115 and outputs a sync signal ISHSYN- 0S in the main scanning direction of printing and a sync signal ISVSYN-0 in the sub-scanning direction of printing.

A sync signal TYVDEN-0 for yellow in the sub-scanning direction, a sync signal TYHDEN-0 for yellow in the main scanning direction, image data TYDATx-1 of yellow and position data TYPOSx-1 of the image data of yellow are supplied from the DMC 124Y to the ISP 115Y. Further, the sync signal TYVDEN-0 of yellow in the sub-scanning direction is supplied from the DMC 124Y to the ISP 115M.

A sync signal TMVDEN-0 for magenta in the sub-scanning direction, a sync signal TMHDEN-0 for magenta in the main scanning direction, image data TMDATx-1 of magenta and position data TMPOSx-1 of the image data of magenta are supplied from the DMC 124M to the ISP 115M. Further, the sync signal TMVDEN-0 of magenta in the sub-scanning direction is supplied from the DMC 124M to the ISP 115C.

An external sync signal IMVSYN-0 is supplied from the ISP 115M to the DMC 124M.

The ISP 115M contains a counter 130M and outputs an external sync signal IMVSYN-0 having preset pulse width to the DMC 124M when the count of the counter 130M reaches a preset count ($\Delta t$). The preset count can be obtained by subtracting image processing time (2H) by the image processing section 118 from the sum of an aligning value and the number of lines (1771 lines) corresponding to the feed distance of the copy paper P from the photosensitive drum 44a to the photosensitive drum 44b.

The count of the counter 130M is set by the main CPU 116. The pulse width of the external sync signal IMVSYN-0 corresponds to the preset number of pulses of the sync signal TMHDEN-0 for magenta in the main scanning direction.

A sync signal TCVDEN-0 for cyan in the sub-scanning direction, a sync signal TCHDEN-0 for cyan in the main scanning direction, image data TCDATx-1 of cyan and position data TCPOSx-1 of the image data of cyan are supplied from the DMC 124C to the ISP 115C. Further, the sync signal TCVDEN-0 of cyan in the sub-scanning direction is supplied from the DMC 124C to the ISP 115BK.

An external sync signal ICVSYN-0 is supplied from the ISP 115C to the DMC 124C.

The ISP 115C contains a counter 130C and outputs an external sync signal ICVSYN-0 having preset pulse width to the DMC 124C when the count of the counter 130C reaches a preset count ($\Delta t$). The preset count can be obtained by subtracting image processing time (2H) by the image processing section 118 from the sum of an aligning value and the number of lines (1771 lines) corresponding to the feed distance of the copy paper P from the photosensitive drum 44b to the photosensitive drum 44c.

The count of the counter 130C is set by the main CPU 116. The pulse width of the external sync signal ICVSYN-0 corresponds to the preset number of pulses of the sync signal TCHDEN-0 of cyan in the main scanning direction.

A sync signal TKVDEN-0 for black in the sub-scanning direction, a sync signal TKHDEN-0 for black in the main scanning direction, image data TKDATx-1 of black and position data TKPOSx-1 of the image data of black are supplied from the DMC 124BK to the ISP 115BK. Further, the sync signal TKVDEN-0 of black in the sub-scanning direction is supplied from the DMC 124BK to the ISP 115BK.

An external sync signal IKVSYN-0 is supplied from the ISP 115BK to the DMC 124BK.

The ISP 115BK contains a counter 130BK and outputs an external sync signal IKVSYN-0 having preset pulse width to the DMC 124BK when the count of the counter 130BK reaches a preset count ($\Delta t$). The preset count can be obtained by subtracting image processing time (2H) by the image processing section 118 from the sum of an aligning value and the number of lines (1771 lines) corresponding to the feed distance of the copy paper P from the photosensitive drum 44c to the photosensitive drum 44d.

The count of the counter 130BK is set by the main CPU 116. The pulse width of the external sync signal IKVSYN-0 corresponds to the preset number of pulses of the sync signal TKHDEN-0 of black in the main scanning direction.

Figure 8:
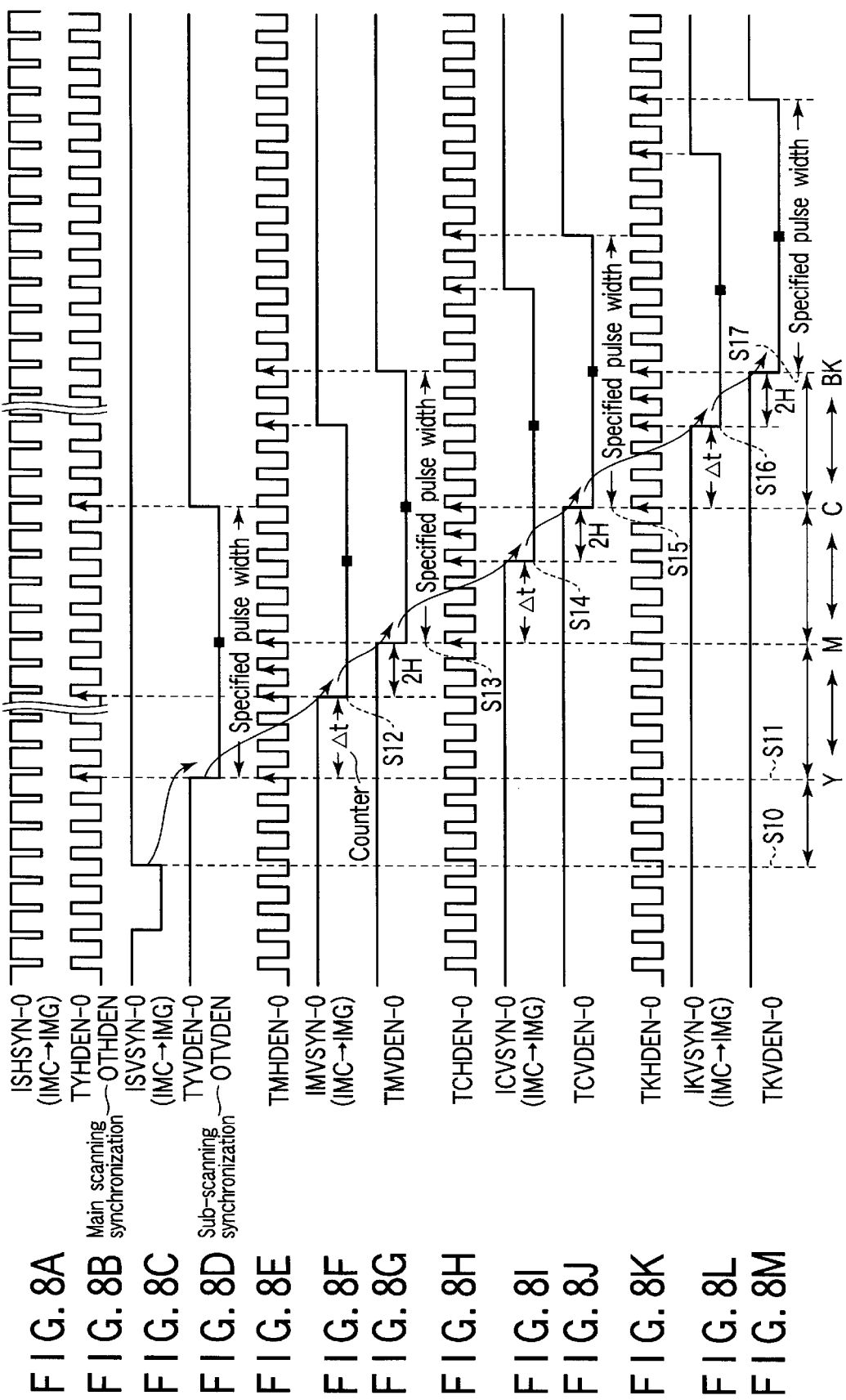
FIGS. 8A to 8M are timing charts for illustrating transfer signals between the delay memory controller of the timing adjusting section and ISP of the color printer section.
Figure 9:
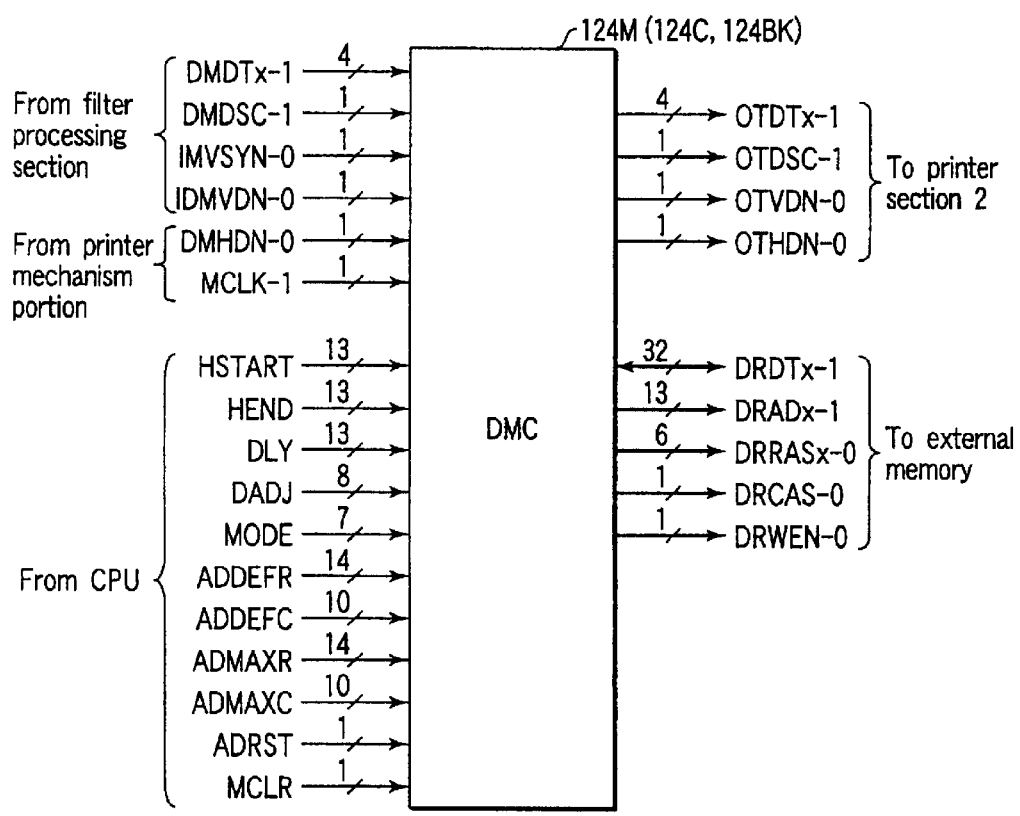
FIG. 9 is a block diagram for illustrating input/output signals of the delay memory controller (DMC)

With the above configuration, a sync signal ISHSYN-0 in the main scanning direction of printing as shown in FIG. 8A is output from the sync signal generator 115a of the printer mechanism portion 115 to the DMCs 124Y, 124M, 124C, 124BK and a sync signal ISVSYN-0 in the sub-scanning direction of printing as shown in FIG. 8C is output from the sync signal generator 115a to the DMC 124Y.

Therefore, the DMC 124Y outputs a sync signal TYHDEN-0 of yellow in the main scanning direction as shown in FIG. 8B to the ISP 115Y in synchronism with the sync signal ISHSYN supplied thereto.

Likewise, the DMC 124M outputs a sync signal TMHDEN-0 of magenta in the main scanning direction as shown in FIG. 8E to the ISP 115M in synchronism with the sync signal ISHSYN supplied thereto.

Further, the DMC 124C outputs a sync signal TCHDEN-0 of cyan in the main scanning direction as shown in FIG. 8H to the ISP 115C in synchronism with the sync signal ISHSYN supplied thereto.

The DMC 124BK outputs a sync signal TKHDEN-0 of black in the main scanning direction as shown in FIG. 8K to the ISP 115BK in synchronism with the sync signal ISHSYN supplied thereto.

In this state, the DMC 124Y outputs a sync signal TYVDEN-0 of yellow in the sub-scanning direction as shown in FIG. 8D to the ISP 115Y when start delay time has elapsed from the rise time (S10) of the sync signal ISVSYN supplied thereto.

The start delay time is delay time from when the operation of the color scanner section 1 is started until the image processing operation has been performed in the image processing section 118.

That is, the start delay time is equal to the sum of the processing time by the color scanner section 1 and the image processing time by the image processing section 118.

A T value (delay value, $T_{Y-M}$, $T_{M-C}$, $T_{C-BK}$) is equal to "photosensitive drum pitch ($\approx$75 mm)"+"aligning value". At (delay amount of I*VSYN-0) is equal to a value obtained by subtracting DMC delay time (which requires at least 2H) of 1 mm from the delay value.

$\Delta t$=I*VSYN-0, and the delay amount="T value" "start delay ($\approx$2H) of the image processing section 118".

Further, the DMC 124Y outputs the image data TYDATx-1 of yellow and position data TYPOSx-1 of the image data of yellow to the ISP 115Y based on the sync signal TYHDEN-0 in the main scanning direction and the sync signal TYVDEN-0 in the sub-scanning direction.

Thus, the printer mechanism portion 115 prints an image of yellow on copy paper P according to image data of yellow from the ISP 115Y.

In this case, the image data TYDATx-1 of yellow is registered into a page memory (not shown) based on the sync signal TYHDEN-0 in the main scanning direction, sync signal TYVDEN-0 in the sub-scanning direction, and position data TYPOSx-1 of the image data of yellow.

Further, the sync signal TYVDEN-0 of yellow in the sub-scanning direction output from the DMC 124Y is supplied to the counter 130M of the ISP 115M.

As a result, the counter 130M starts to count the number of pulses of the sync signal TYHDEN-0 with the falling edge of the sync signal TYVDEN-0 used as a reference. When the count reaches a preset count (Δt) (S12), the ISP 115M outputs an external sync signal IMVSYN-0 as shown in FIG. 8F. The width of the external sync signal IMVSYN-0 is the same as that of the sync signal TYVDEN-0 of yellow in the sub-scanning direction.

The DMC 124M outputs a sync signal TMVDEN-0 of magenta in the sub-scanning direction as shown in FIG. 8G together with image data when 2H has elapsed after the falling edge of the sync signal IMVSYN-0 (S13). The width of the sync signal TMVDEN-0 is the same as that of the sync signal IMVSYN-0.

Further, the DMC 124M outputs the image data TMDATx-1 of magenta and position data TMPOSx-1 of the image data of magenta to the ISP 115M based on the sync signal TMHDEN-0 in the main scanning direction and the sync signal TMVDEN-0 in the sub-scanning direction.

Thus, the printer mechanism portion 115 prints an image of magenta on the copy paper P according to image data of magenta from the ISP 115M.

In this case, the image data TMDATx-1 of magenta is registered into a page memory (not shown) based on the sync signal TMHDEN-0 in the main scanning direction, sync signal TMVDEN-0 in the sub-scanning direction and position data TMPOSx-1 of the image data of magenta.

Further, the sync signal TMVDEN-0 of magenta in the sub-scanning direction output from the DMC 124M is supplied to the counter 130C of the ISP 115C.

As a result, the counter 130C starts to count the number of pulses of the sync signal TCVDEN-0 with the falling edge of the sync signal TMVDEN-0 set as a reference. When the count reaches a preset count (Δt) (S14), the ISP 115C outputs an external sync signal ICVSYN-0 as shown in FIG. 8I. The width of the external sync signal ICVSYN-0 is the same as that of the sync signal TMVDEN-0 of magenta in the sub-scanning direction.

The DMC 124C outputs a sync signal TCVDEN-0 of cyan in the sub-scanning direction as shown in FIG. 8J together with image data when 2H has elapsed (S15) with the falling edge of the sync signal ICVSYN-0 set as a reference. The width of the sync signal TCVDEN-0 is the same as that of the sync signal ICVSYN-0.

Further, the DMC 124C outputs the image data TCDATx-1 of cyan and position data TCPOSx-1 of the image data of cyan to the ISP 115C based on the sync signal TCHDEN-0 in the main scanning direction and the sync signal TCVDEN-0 in the sub-scanning direction.

Thus, the printer mechanism portion 115 prints an image of cyan on the copy paper P according to image data of cyan from the ISP 115C.

In this case, the image data TCDATx-1 of cyan is registered into a page memory (not shown) based on the sync signal TCHDEN-0 in the main scanning direction, sync signal TCVDEN-0 in the sub-scanning direction and position data TCPOSx-1 of the image data of cyan.

Further, the sync signal TCVDEN-0 of cyan in the sub-scanning direction output from the DMC 124C is supplied to the counter 130BK of the ISP 115BK.

As a result, the counter 130BK starts to count the number of pulses of the sync signal TCHDEN-0 with the falling edge of the sync signal TCVDEN-0 set as a reference. When the count reaches a preset count (Δt) (S16), the ISP 115BK outputs an external sync signal IKVSYN-0 as shown in FIG. 8L. The width of the external sync signal IKVSYN-0 is the same as that of the sync signal TCVDEN-0 of cyan in the sub-scanning direction.

The DMC 124BK outputs a sync signal TKVDEN-0 of black in the sub-scanning direction as shown in FIG. 8M together with image data when 2H has elapsed (S17) after the falling edge of the sync signal IKVSYN-0. The width of the sync signal TKVDEN-0 is the same as that of the sync signal IKVSYN-0.

Further, the DMC 124BK outputs the image data TKDATx-1 of black and position data TKPOSx-1 of the image data of black to the ISP 115BK based on the sync signal TKHDEN-0 in the main scanning direction and the sync signal TKVDEN-0 in the sub-scanning direction.

Thus, the printer mechanism portion 115 prints an image of black on the copy paper P according to image data of black from the ISP 115BK.

In this case, the image data TKDATx-1 of black is registered into a page memory (not shown) based on the sync signal TKHDEN-0 in the main scanning direction, sync signal TKVDEN-0 in the sub-scanning direction and position data TKPOSx-1 of the image data of black.

At the time of copying by use of the page memory, IPVSYN-0 is used instead of ISVSYN-0 and the start delay time is calculated based on the system processing time and the image processing time by the image processing section 118.

That is, the start delay time="system processing time"+"image processing time by the image processing section 118".

Next, input/output signals of the DMC 124M are explained with reference to FIG. 9 and FIGS. 10A to 10C.

The DMC 124M is supplied with a start value HSTART (13 bits) of the effective pixel in the main scanning direction, a last value HEND (13 bits) of the effective pixel in the main scanning direction, a reference value DLY (seven bits) of the number of delay lines, a fine adjustment value DADJ (eight bits) of the number of delay lines, a mode set value MODE (seven bits), an initial value ADDEFR (14 bits) of a row address, an initial value ADDEFC (10 bits) of a column address, the maximum value ADMAXR (14 bits) of the row address, the maximum value ADMAXC (10 bits) of the column address, a reset set value ADRST (one bit) of an address counter and a clear mode set value MCLR (one bit) of the memory as control signals from the main CPU 116.

Further, the DMC 124M is supplied with image data DMDTx-1 (four bits) and identification signal DMDSC-1 (one bit) from a filter processing section 123M, an image clock MCLK-1 (one bit) from an oscillator (not shown), a sub-scanning sync signal IMVSYN-0 (one bit) from the ISP 115M, a data enable signal IDMVDN-0 (one bit) in the sub-scanning direction and a data enable signal DMHDN-0 (one bit) in the main scanning direction.

The DMC 124M outputs data enable signals OTVDN-0 (one bit), OTHDN-0 (one bit) in the sub-scanning direction, data enable signal OTDTx-1 (one bit) in the main scanning direction, identification signal OTDSC-1 (one bit), DRAM read/write data DRDTx-1 (32 bits), DRAM address signal DRADx-1 (13 bits), DRAM RAS signal DRRASx-0 (six bits), DRAM CAS signal DRCAS-0 (one bit), and DRAM write enable signal DRWEN-0 (one bit) to the delay memory 125M.

Figure 10A:
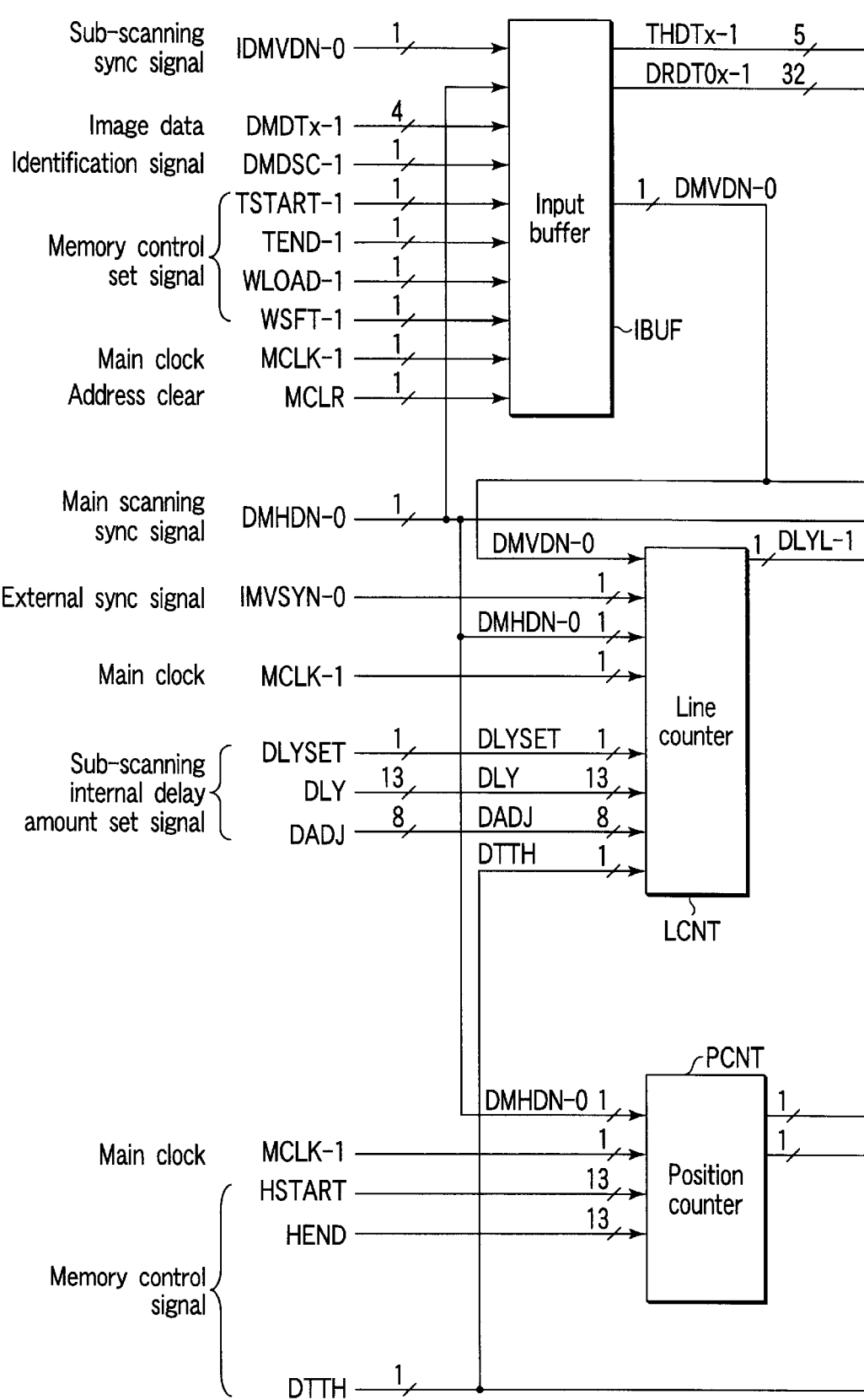
FIGS. 10A to 10C are block diagrams for illustrating the schematic configuration of the delay memory controller (DMC)
Figure 10B:
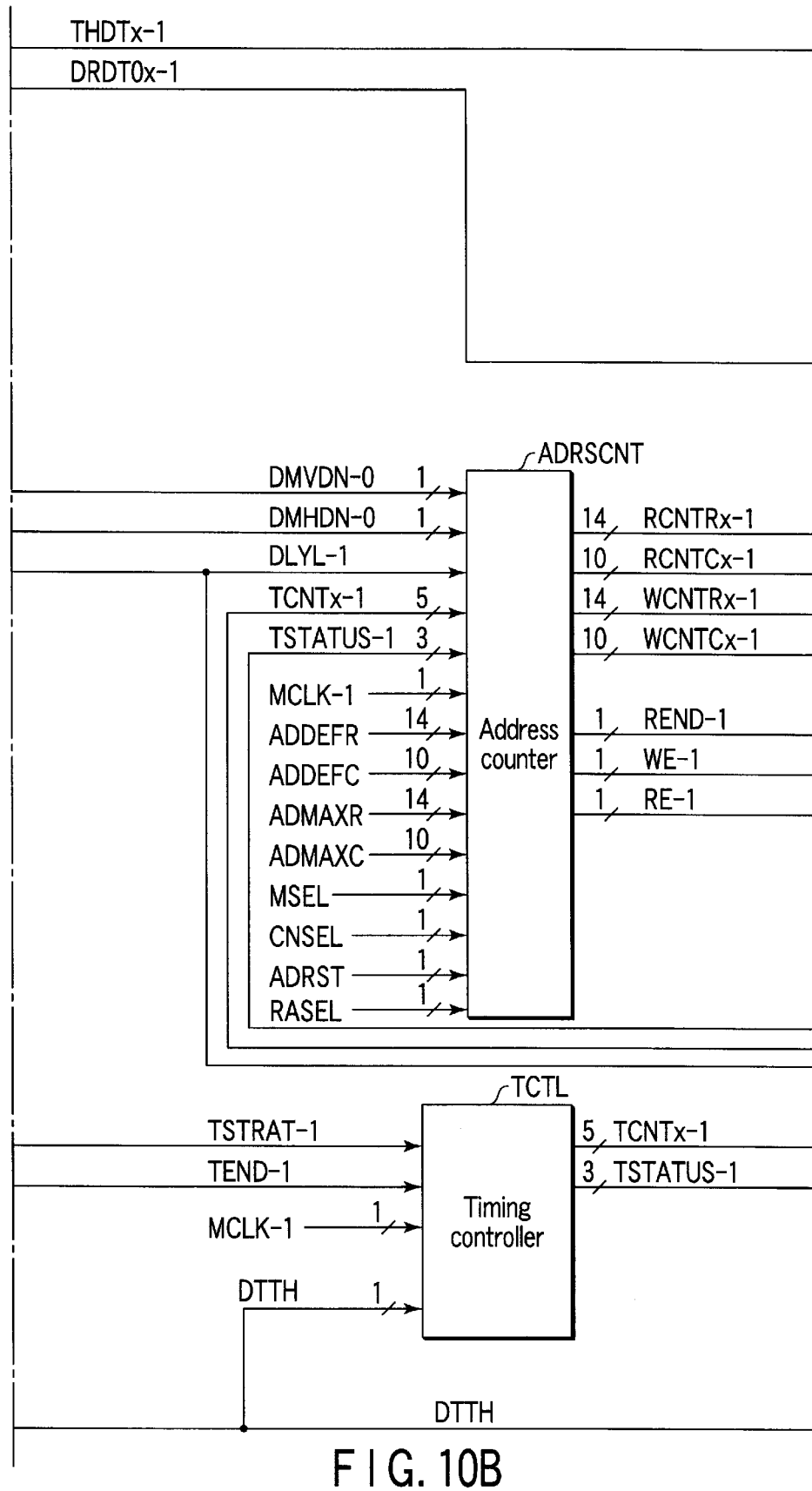
Figure 10C:
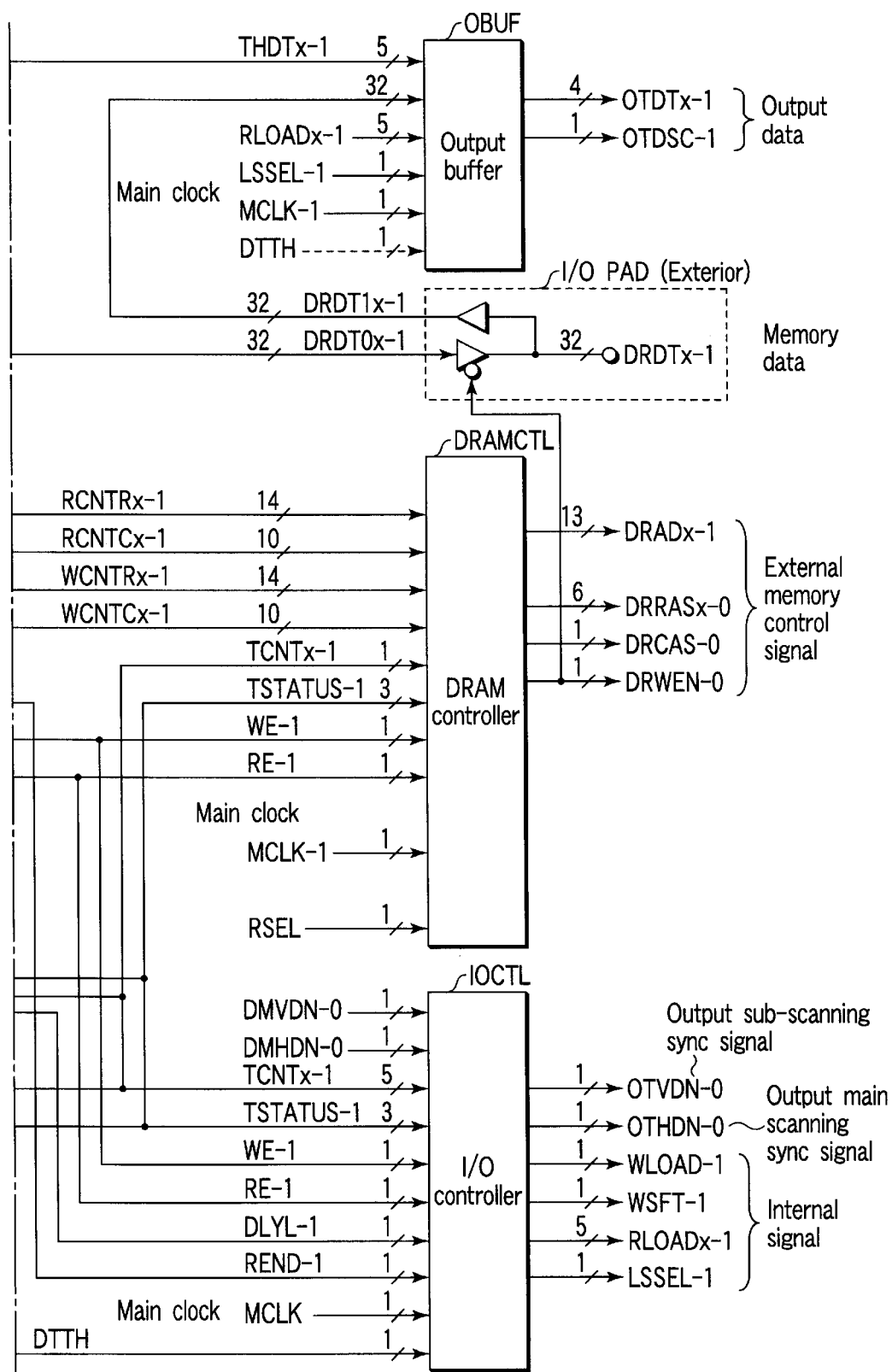

As shown in FIGS. 10A to 10C, the DMC 124M is configured by an input buffer IBUF, line counter LCNT, coordinate counter PCNT, timing controller TCTL, address counter ADRSCNT, output buffer OBUF, external connecting portion I/OPAD, DRAM controller DRAMCTL and I/O controller IOCTL.

The input buffer IBUF is used to convert the pulse width of image data according to the data bus width of an externally connected memory (for example, DRAM) 125M. The input buffer IBUF is an input interface portion.

The input buffer IBUF is supplied with a sub-scanning sync signal IDMVDN-0 (one bit), image data DMDTx-1 (four bits), identification signal DMDSC-1 (one bit), TSTART (one bit), TEND (one bit), WLOAD (one bit), MCLK-1 (one bit), MCLR (one bit) and DMHDN-0 (one bit). Further, THDTx-1 (five bits), DRDTOx-1 (32 bits) and sub-scanning direction data enable signal DMVDN-0 (one bit) are output from the input buffer IBUF.

The line counter LCNT is a sub-scanning counter which counts a sub-scanning delay amount in the internal delay mode and generates a signal used to start the read address counter of the delay memory 125M (first mode) when the sub-scanning delay amount reaches a preset delay amount (a value set by DLY+DADJ).

The line counter LCNT is supplied with an external sync signal IMVSYN and generates a delay memory start signal DLYL-1 (second mode) when the external sync signal is set in an enable state.

Switching between the above two modes is made according to a value of the DLYSET register.

The line counter LCNT is supplied with a sub-scanning direction data enable signal DMVDN-0 (one bit), external sync signal IMVSYN-0 (one bit), main scanning direction data enable signal DMHDN-0 (one bit), image clock MCLK-1 (one bit), delay line number mode set value DLYSET (one bit), delay line number reference value DLY (13 bits), delay line number fine adjusting value DADJ (eight bits) and Y/M, C, BK selection signal DTTH (one bit). Further, a delay memory start signal DLYL-1 (one bit) is output from the line counter LCNT.

The coordinate counter PCNT is an area control section which determines an image area in the main scanning direction output to the delay memory.

The coordinate counter PCNT is supplied with a main scanning direction data enable signal DMHDN-0 (one bit), image clock MCLK-1 (one bit), HSTART (13 bits), final value HEND (13 bits) of the effective pixel in the main scanning direction and Y/M, C, BK selection signal DTTH (one bit). Further, a TSTART-1 (one bit) and TEND (one bit) are output from the coordinate counter PCNT.

The timing controller TCTL is a block which generates status information to actually access the memory in response to an image area signal from the PCNT block.

The timing controller TCTL is supplied with TSTART-1 (one bit), TEND (one bit), MCLK-1 (one bit) and DTTH (one bit), and TCNTx-1 (five bits) and TSTATUS-1 (three bits) are output from the timing controller TCTL.

The address counter ADRSCNT is a block which generates a write/read address signal for the delay memory based on a main scanning sync signal (DMHDN-0), sub-scanning sync signal (DMVDN-0) and main clock (MCLK-1) signal which are input from the preceding-stage image processing section and status information TSTART-1 from the TCTL block.

The address counter ADRSCNT is supplied with a sub-scanning direction data enable signal DMVDN-0 (one bit), main scanning direction data enable signal DMHDN-0 (one bit), read cycle start signal DLYL-1 (one bit), ring counter value CNTx-1 (five bits), read/write cycle status display signal TSTATUS-1 (three bits), main clock (image clock) MCLK-1 (one bit), initial value ADDEFR (14 bits) of the row address, initial value ADDEFC (10 bits) of the column address, maximum value ADMAXR (14 bits) of the row address, maximum value ADMAXC (10 bits) of the column address, set value MSEL (one bit) of the number of column addresses of the DRAM used, column address maximum value selection signal CMSEL (one bit), address counter reset setting signal ADRST (one bit) and read address counter mode select signal RLSEL (one bit).

The row address initial value ADDEFR, column address initial value ADDEFC, row address maximum value ADMAXR, column address maximum value ADMAXC, column address number set value MSEL of the DRAM used, column address maximum value selecting signal CMSEL, address counter reset setting signal ADRST and read address counter mode select signal RLSEL are respectively set in registers ACa to ACi of the address counter ADRSCNT.

The mode select signal RLSEL indicates a conventional mode when it is set at "0", and indicates an address load mode in which "write address start value=read address start value" when it is set at "1".

The address mode is a function of loading the start address of a write address into the start address of a read address in the unit of page instead of independently counting up the write address and read address in the conventional case.

By additionally providing the above function, it becomes possible to prevent occurrence of erroneous operation of the DMC due to non-coincidence between the write address and the read address in the unit of page.

A read address count value (read row address value) RCNTRx-1 (14 bits), read address count value (read column address value) RCNTCx-1 (10 bits), write address count value (write row address value) WCNTRx-1 (14 bits), write address count value (write column address value) WCNTCx-1 (10 bits), read cycle end signal REND-1 (one bit), write period display signal WE-1 (one bit) and read period display signal RE-1 (one bit) are output from the address counter ADRSCNT.

The output buffer OBUF is an image output block which outputs an image signal read out from the DRAM to the succeeding stage.

In the above block, a data conversion process is also performed to output a data signal read out from the memory to the succeeding stage as image data.

The output buffer OBUF is supplied with THDTx-1 (five bits), DRDTI-1 (32 bits), RLOADx (five bits), LSSFL (one bit), MCLK-1 (one bit) and DTTH (one bit) and outputs OTDTx-1 (four bits) and DTDSC-1 (one bit).

The external connecting portion I/OPAD is supplied with DRDTOx-1 (32 bits), DRUTx-1 (32 bits) and DRWEN-0 (one bit) and outputs DRDTIx-1 (32 bits). DRDTOx-1 (32 bits) or DRUTx-1 (32 bits) is selectively output according to the status of DRWEN-0.

The DRAM controller DRAMCTL is a block which generates an access signal actually used with respect to the DRAM in response to outputs of the input buffer IBUF, timing controller TCTL and address counter ADRSCNT.

The DRAM controller DRAMCTL is supplied with RCNTRx-1 (14 bits), RCNTCx-1 (10 bits), WCNTRx-1 (14 bits), WCNTCx-1 (10 bits), TCNTx-1 (five bits), TSTATUS-1 (three bits), WE-1 (one bit), RE-1 (one bit), MCLK-1 (one bit) and RSEL-1 (one bit) and outputs a DRAM address signal DRADx-1 (13 bits), DRAM RAS signal DRRASx-0 (six bits), DRAM CAS signal DRCAS-0 (one bit) and DRAM write enable signal DRWEN-0 (one bit).

The I/O controller IOCTL is a block which outputs main scanning and sub-scanning control signals in response to LCNT, TCTL signals.

The I/O controller IOCTL is supplied with DMVDN-0 (one bit), DMHDN-0 (one bit), TCNTx-1 (five bits), TSTATUS-1 (three bits), WE-1 (one bit), RE-1 (one bit), DLYL-1 (one bit), REND-1 (one bit) and MCLK-1 (one bit) and outputs OTVDN-0 (one bit), OTHDN-0 (one bit), WLOAD-1 (one bit), WSFT-1 (one bit), RLOAD-1 (five bits) and LSSEL-1 (one bit).

Figure 11B:
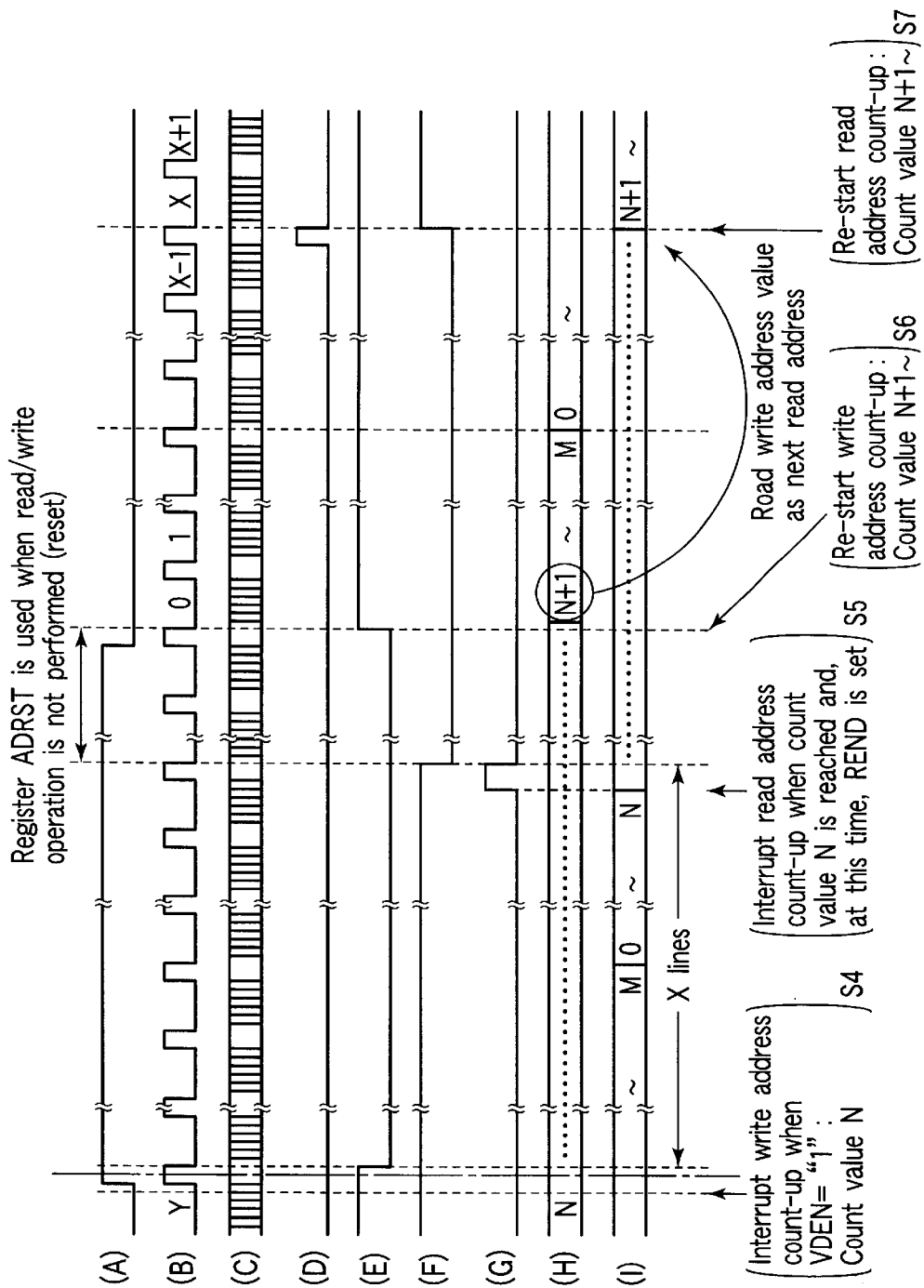

With the above configuration, the process in the address load mode by the address counter ADRSCNT is explained with reference to the timing charts shown in FIGS. 11A, 11B. FIGS. 11A, 11B are drawn to partly overlap each other so as to explain the continuity therebetween.

For example, "1" is set in the register ACi in the address counter ADRSCNT as the mode select signal ELSEL according to the set contents from the main CPU 116 and the address load mode is set.

That is, the address counter ADRSCNT starts the counting-up process from the initial value of the write address (S1) when the sub-scanning direction data enable signal DMVDN-0 is set to the low level as shown in (A) of FIG. 11A and the falling signal of the main scanning direction data enable signal DMHDN-0 is supplied as shown in (B) of FIG. 11A. Further, the address counter ADRSCNT changes the write period display signal WE-1 to the high level as shown in (E) of FIG. 11A. After this, each time the falling signal of the main scanning direction data enable signal DMHDN-0 is supplied, the write address is counted up as shown in (H) of FIG. 11A.

Then, the address counter ADRSCNT starts the counting-up process from the initial value of the read address (S2) when the falling signal of the delay memory start signal DLYL-1 from the line counter LCNT is supplied as shown in (D) of FIG. 11A. Further, the address counter ADRSCNT changes the read period display signal RE-1 to the high level as shown in (F) of FIG. 11A. After this, each time the falling signal of the main scanning direction data enable signal DMHDN-0 is supplied, the read address is counted up as shown in (I) of FIG. 11A.

Then, as shown in (H) of FIG. 11A, the address counter ADRSCNT resets the write address value to "0" (S3) when the write address value is counted up to the address maximum value M. Further, as shown in (I) of FIG. 11A, the address counter ADRSCNT resets the read address value to "0" when the read address value is counted up to the address maximum value M.

Thus, in a case where the process for the number of lines of one page is performed, the address counter ADRSCNT interrupts the counting-up process of the write address as shown in (H) in FIG. 11A (S4) when the sub-scanning direction data enable signal DMVDN-0 is set to the high level as shown in (A) of FIG. 11A.

The address counter ADRSCNT changes the write period display signal WE-1 to the low level as shown in (E) of FIG. 11A when the sub-scanning direction data enable signal DMVDN-0 is set to the high level as shown in (A) of FIG. 11A and the falling signal of the main scanning direction data enable signal DMHDN-0 is supplied as shown in (B) of FIG. 11A.

Next, the address counter ADRSCNT interrupts the counting-up process of the read address (5) when the read address count value reaches "N" as shown in (I) in FIG. 11B. Further, the address counter ADRSCNT sets the read cycle end signal REND-1 to the high level as shown in (G) of FIG. 11B and outputs the same.

The address counter ADRSCNT changes the read cycle end signal REND-1 to the low level as shown in (G) of FIG. 11B and changes the write period display signal WE-1 to the low level as shown in (E) of FIG. 11B when the falling signal of the main scanning direction data enable signal DMHDN-0 is supplied as shown in (B) of FIG. 11B.

Then, the address counter ADRSCNT starts the counting-up process again from the write address of "N+1" (S6) when the sub-scanning direction data enable signal DMVDN-0 is set to the low level as shown in (A) of FIG. 11B and the falling signal of the main scanning direction data enable signal DMHDN-0 is supplied as shown in (B) of FIG. 11B. Further, the address counter ADRSCNT changes the write period display signal WE-1 to the high level as shown in (E) of FIG. 11B.

Further, the address counter ADRSCNT loads the write address value "N+1" into the read address register as a next read address.

After this, each time the falling signal of the main scanning direction data enable signal DMHDN-0 is supplied, the write address is counted up as shown in (H) of FIG. 11B.

Then, the address counter ADRSCNT starts the counting-up process (S7) by using the write address value "N+1" as the initial value of the read address as shown in (I) of FIG. 11B when the falling signal of the delay memory start signal DLYL-1 from the line counter LCNT is supplied as shown in (D) of FIG. 11B. Further, the address counter ADRSCNT changes the read period display signal RE-1 to the high level as shown in (F) of FIG. 11B. After this, each time the falling signal of the main scanning direction data enable signal DMHDN-0 is supplied, the read address is counted up as shown in (I) of FIG. 11B.

Next, a memory address control method at the time of high speed operation is explained.

The address control method of the delay memory controller at the time of successive high-speed printing is described.

The delay memory control method at the time of successive printing of two pages is explained with reference to timing charts shown in FIGS. 12A to 12D, FIGS. 13A to 13D, FIGS. 14A to 14D.

FIGS. 12A to 12D are timing charts showing the normal printing state in which the first page and the second page are separated.

A write address which is used to write image data into the memory is generated by the delay memory controller according to an input sub-scanning sync signal (DVDEN).

In the drawing, assume that the write top address is W1.

Generally, the write top address is set so as to permit the count-up process to be started from an address next to the final address which is used to write image data of the previous page and the initial value thereof is set to "0".

Image data written into the memory is sequentially read out in order from the W1 address which is the same as the written address by the delay memory controller according to the external sync signal which corresponds to delay due to the distance between the drums. In this case, in order to determine the read start address, it is necessary to store the write start address W1 of the page in the internal portion.

By the above operation, the delay memory controller is only required to start readout of the delay memory starting from the stored write start address by using the external sync signal which corresponds to a delay amount due to the distance between the drums as a trigger and can be realized in a simple circuit configuration.

FIGS. 13A to 13D show timings at which readout from the delay memory is started at or after the second page.

In this case, the sufficient operation cannot be attained only by the timing control shown in FIGS. 12A to 12D, and in order to determine the readout start address, it is necessary to store at least two start addresses W1, W2 for the preceding page and second page.

FIGS. 14A to 14D shows the timing at which the write operation for the second page is started in the course of readout of the first page. In the case of the above timing, it is necessary to perform a process which prevents the readout operation from the W1 address from becoming abnormal even when the writing operation for the second page is started (start address: W2) at the time of readout in response to the external sync signal (start address: W1).

In order to meet the above requirement, it is necessary to perform the control operation so as to start the read operation of the W2 address after the read operation starting from the W1 address is completed.

As described before, the readout start address can be determined by storing at least two write start addresses for the previous page and the normal operation can be performed even when the write operation is continuously performed before an image is read out from the memory by using the previous write start address.

As described above, by providing sync signal generating means for reading out data from the memory in addition to the delay memory controller (DMC), delay caused by the distances between the 4-series photosensitive drums can be corrected without interrupting the operation in order to switch the control process of the memory controller.

Further, inconsistency in the operation for controlling addresses occurring at the time of successive writing into the memory and successive readout from the memory can be eliminated and a higher speed printing process can be attained.

Therefore, in order to meet the requirement for enhancing the operation speed of the recent 4-series drum type printer, the high-speed image output system of the delay memory controller whose operation speed is difficult to be made high only by use of the conventional control system can be provided.

In this embodiment, in a high-speed processing system in which the first page and second page are successively input, a system which can perform the successive high-speed delay process by receiving a delay amount control signal from the engine portion and controlling the delay amount and can easily correct differences between delay amounts caused by distances between the drums due to registration can be provided other than the conventional delay control system.

This invention provides an image forming apparatus of 4-series drum configuration which includes means for storing input image signals into a memory for respective colors, and means including means for generating an address of the memory, means for controlling the operation of the memory and control means for controlling the whole portion of the apparatus, for reading out the image signal stored in the memory according to an external sync signal and has a function of correcting the relative position of the images of the respective colors by correcting output timing of the external sync signal.

The external sync signal can be generated by use of different control means based on registration information of the printer section.

The apparatus has two modes including a mode in which the image signal is read out by use of the external sync signal and a mode in which an image sync signal input to the memory address generating means is counted to generate a readout signal and the above two operation modes can be switched by use of the means for controlling the whole portion of the apparatus.

When the image signal is stored into the memory, a characteristic amount signal of the image can be stored into the memory together with the color component of the image data and output to the succeeding stage.

Further, the apparatus can be provided with a mode in which the image signal is delayed and a pass path in which the image signal is not delayed.

Timing at which the external sync signal is output is determined such that a sync signal of a color to be output can be generated by setting the output timing of a color before the output color as a reference.

Further, this invention provides an image forming apparatus of 4-series drum configuration which includes means for storing input image signals into a memory for respective colors, and means including means for generating an address of the memory and means for controlling the operation of the memory, for reading out the image signal stored in the memory according to an external sync signal from an image forming section and has a function of correcting the relative position of the images of the respective colors by correcting output timing of the external sync signal, wherein the image signal is read out in synchronism with the external sync signal by using a write start address of the memory in which the image is stored as a readout start address.

The write start address can be started from the write end address of the preceding page.

The readout start address can be determined by use of means for storing at least two previous write start addresses and the normal operation can be performed even when the write process is successively performed before the image is read out from the memory by using the previous write start address.

Further, this invention provides an image forming apparatus of 4-series drum configuration which includes means for storing image signals into a memory for respective input colors, and means including means for generating an address of the memory and means for controlling the operation of the memory, for reading out the image signal stored in the memory according to an external sync signal from an image forming section and has a function of correcting the relative position of the images of the respective colors by correcting output timing of the external sync signal, wherein the apparatus further includes means for converting image data into image data to be stored into the memory which stores image data and the converting means is configured to make "image bit number x N" equal to "bit number of the memory bus×M1", where N indicates the number of images and M indicates the number of accesses to the memory.

The upper limit of the memory addresses can be changed by the memory address control method (the capacity of the external memory can be changed (128 MB→256 MB)).

The write address for image data into the image memory permits the write process to be successively performed from the final one of the previous write addresses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a supply section which supplies image data items of different colors;
   an image forming section including a feeding section which feeds a recording medium, a plurality of image forming units which respectively have rotatable photosensitive drums arranged side by side on said feeding section and transfer the respective image data items of different colors onto the recording medium fed by said feeding section, and an output section which outputs sync signals in a sub-scanning direction in synchronism with processes performed by said image forming units;
   a delay section which delays the image data items of respective colors from said supply section by the feeding times of the recording medium corresponding to intervals between said image forming units, based on the sync signals from said output section of said image forming section, and outputs the image data items to said image forming section,
   wherein a mode in which image data is delayed and a mode in which image data is not delayed are provided.

2. An image forming apparatus of a 4-series drum configuration comprising:
   means for storing input image signals into a memory for respective colors;
   means for generating an address of the memory;
   means for controlling an operation of the memory;
   control means for controlling the whole apparatus;
   means for reading out the image signal stored in the memory according to an external sync signal; and
   means for correcting the relative positive of the images of the respective colors by correcting the output timing of the external sync signal, wherein the apparatus has two operation modes including a mode in which the image signal is read out by use of the external sync signal and a mode in which an image sync signal input to the memory address generating means is counted to generate a readout signal, and the above two operation modes are switched by use of the control means for controlling the whole apparatus.

3. The image forming apparatus according to claim 2, further comprising a mode in which the image signal is delayed and a pass path in which the image signal is not delayed.

4. The image forming apparatus according to claim 2, wherein the timing at which the external sync signal is output is determined such that a sync signal of a color to be output is generated by setting the output timing of a color before the output color as a reference.

5. An image forming apparatus of a 4-series drum configuration comprising:
   means for storing input image signals into a memory for respective colors;
   means for generating an address of the memory;
   means for controlling an operation of the memory;
   means for reading out the image signal stored in the memory according to an external sync signal from an image forming section; and
   means for correcting the relative position of the images of the respective colors by correcting the output timing of the external sync signal,
   wherein a write start address of the memory in which the image is stored is read out in synchronism with the external sync signal as a readout start address, and
   wherein the readout start address includes a means for storing at least two previous write start addresses, and a normal operation can be performed even when the write process is successively performed before the image is read out from the memory by using the previous write start address.

6. An image forming apparatus of a 4-series drum configuration comprising:
   a means for storing image signals into a memory for respective input colors;
   a means for generating an address of the memory;
   a means for controlling an operation of the memory;
   a means for reading out the image signal stored in the memory according to an external sync signal from an image forming section;
   a means for correcting the relative position of the images of the respective colors by correcting output timing of the external sync signal; and
   a means for converting image data into image data to be stored in the memory which stores image data;
   wherein the converting means is configured to make "image bit number×N" equal to "bit number of the memory bus×M", where N indicates the number of images and M indicates the number of accesses to the memory.

7. The image forming apparatus according to claim 6, wherein an upper limit of the memory addresses is changed by a memory address control method.

8. The image forming apparatus according to claim 6, wherein the write address for image data in the image memory permits the write process to be successively performed from the final one of the previous write addresses.

9. An image forming apparatus comprising:
   a supply section which supplies image data items of different colors;
   an image forming section including a feeding section which feeds a recording medium, a plurality of image forming units which respectively have rotatable photosensitive drums arranged side by side on said feeding section and transfer the respective image data items of different colors onto the recording medium fed by said feeding section, and an output section which outputs a sync signal in a sub-scanning direction in synchronism with processes performed by said image forming units;
   a delay section including a control section having a memory which can delay image data by at least the delay time, said control section controlling readout of the image data stored in the memory, based on the sync signal from said output section of said image forming section, the delay section delaying the image data items of respective colors from said supply section by the feeding time of the recording medium corresponding to intervals between said image forming units, and outputting the image data items to said image forming section;
   a setting section for setting one of a first address mode in which write addresses and read addresses of the memory are independently counted up, and a second address mode in which a start address of the write address of the memory is loaded as a start address of the read address in units of pages;

a first processing means, by counting up the write addresses and read addresses independently when the setting section sets a mode to the first address mode, for causing the control section to control the memory of the image data stored in the memory based on the sync signal from the supply section, and to control the readout of the image data stored in the memory based on the sync signal from the output section of the image forming section; and a second processing means, by loading the start address of the write address of the memory as a start address of the read address in units of pages when the setting section sets a mode to the second address mode, for causing the control section to control the memory of the image data stored in the memory based on the sync signal from the supply section, and to control the readout of the image data stored in the memory based on the sync signal from the output section of the image forming section.

10. An image forming apparatus of a 4-series drum configuration comprising:

means for storing input image signals into a memory for respective colors;

first generating means for generating an address of the memory based on an image sync signal input together with the image signal;

second generating means for generating a readout signal by counting the image sync signal;

means for controlling an operation of the memory;

control means for controlling the whole apparatus, the control means further performing control of switching a first mode in which an external sync signal is output as a readout signal and a second mode in which the readout signal generated from the second generating means is output;

means for reading out the image signal stored in the memory according to the external sync signal during the first mode and for reading out the image signal stored in memory according to the readout signal generated from the second generating means during the second mode; and means for correcting the relative position of the images of the respective colors by correcting the output timing of the external sync signal, wherein the apparatus has two operation modes including a mode in which the image signal is read out by use of the external sync signal and a mode in which an image sync signal input to the memory address generating means is counted to generate a readout signal, and the above two operation modes are switched by use of the control means for controlling the whole apparatus.

* * * * *